United States Patent
Hirai

(10) Patent No.: US 8,036,089 B2
(45) Date of Patent: Oct. 11, 2011

(54) OPTICAL PICK-UP, METHOD OF GENERATING ABERRATION FOR COMPENSATION AND OPTICAL INFORMATION PROCESSING APPARATUS USING THE SAME

(75) Inventor: Hideaki Hirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1463 days.

(21) Appl. No.: 10/584,029

(22) PCT Filed: Nov. 17, 2005

(86) PCT No.: PCT/JP2005/021501
§ 371 (c)(1),
(2), (4) Date: Jun. 22, 2006

(87) PCT Pub. No.: WO2006/054783
PCT Pub. Date: May 26, 2006

(65) Prior Publication Data
US 2007/0147216 A1   Jun. 28, 2007

(30) Foreign Application Priority Data
Nov. 22, 2004   (JP) .................................. 2004-337193

(51) Int. Cl.
*G11B 7/135*   (2006.01)
(52) U.S. Cl. ........... 369/112.01; 369/112.02; 369/44.23; 369/94
(58) Field of Classification Search ............... 369/44.23, 369/44.26, 44.32, 44.37, 44.38, 112.06, 112.07, 369/112.08, 112.02, 118, 112.24, 94, 112.01, 369/53.19
See application file for complete search history.

(56) References Cited

U.S. PATENT DOCUMENTS

| | | | | |
|---|---|---|---|---|
| 5,446,565 A | * | 8/1995 | Komma et al. | 369/44.23 |
| 6,078,554 A | * | 6/2000 | Ootaki et al. | 369/112.02 |
| 6,418,109 B2 | * | 7/2002 | Koyama et al. | 369/118 |
| 6,430,130 B1 | * | 8/2002 | Furukawa | 369/53.19 |
| 6,545,958 B1 | | 4/2003 | Hirai et al. | |
| 6,577,376 B1 | * | 6/2003 | Shih | 369/112.02 |

(Continued)

FOREIGN PATENT DOCUMENTS

EP   0899723   3/1999

(Continued)

OTHER PUBLICATIONS

M. Oku et al., "The goal of Blue-ray Disc," Nikkei Electronics, pp. 135-150, published from Nikkei Business Publications, Inc., on Mar. 31, 2003.

(Continued)

*Primary Examiner* — Hoa T Nguyen
*Assistant Examiner* — Kim-Kwok Chu
(74) *Attorney, Agent, or Firm* — Dickstein Shapiro LLP

(57) ABSTRACT

An optical pick-up to perform recording or reproducing for an optical recording medium is disclosed, which includes a light source configured to emit a light beam, an objective lens configured to focus the light beam onto the optical recording medium, and an aberration generation device provided between the light source and the objective lens, configured to generate coma aberration for the beam focused by the objective lens, based on a detected value from a device configured to detect a degree of tilt of the optical recording medium, wherein the tilt is compensated for by the coma aberration generated by the aberration generation device.

8 Claims, 24 Drawing Sheets

U.S. PATENT DOCUMENTS

| | | | |
|---|---|---|---|
| 6,859,429 B2 * | 2/2005 | Ogasawara et al. | 369/112.02 |
| 7,006,411 B2 | 2/2006 | Hirai | |
| 7,038,995 B2 * | 5/2006 | Kitamura et al. | 369/112.24 |
| 7,050,380 B2 | 5/2006 | Hirai et al. | |
| 7,142,484 B2 * | 11/2006 | Ando et al. | 369/44.23 |
| 7,372,794 B2 * | 5/2008 | Kim et al. | 369/53.19 |
| 2002/0097504 A1 | 7/2002 | Kitamura et al. | |
| 2003/0072247 A1 | 4/2003 | Hirai | |
| 2003/0179673 A1 | 9/2003 | Shimada et al. | |
| 2003/0227859 A1 | 12/2003 | Hirai | |
| 2005/0025026 A1 | 2/2005 | Hirai | |
| 2005/0025028 A1 | 2/2005 | Hirai et al. | |
| 2005/0122879 A1 | 6/2005 | Hirai et al. | |
| 2005/0195485 A1 | 9/2005 | Hirai et al. | |
| 2005/0265216 A1 | 12/2005 | Hirai | |

FOREIGN PATENT DOCUMENTS

| | | |
|---|---|---|
| EP | 1341166 | 9/2003 |
| EP | 1560209 | 8/2005 |
| JP | 11-120617 | 4/1999 |
| JP | 2002-140831 A | 5/2002 |
| JP | 2003-317298 | 11/2003 |
| JP | 2004-103093 | 4/2004 |
| JP | 2004-158102 | 6/2004 |
| JP | 2004-206763 | 7/2004 |
| WO | WO 2004/042715 | 5/2004 |

OTHER PUBLICATIONS

N. Yamada et al., "A next-generation Specification derived from a DVD, "HD DVD"", Nikkei Electronics, pp. 125-134, published from Nikkei Business Publications, Inc., on Oct. 13, 2003.

Richter, H., "Blue laser drive technology for high areal density and volumetric optical data storage"; Conference Presentation [online]; URL: http://www.physik.tu-berlin.de/institute/OI/COST_P8/Files/Paris/COST%20P8%20Richter.pdf> [copy retrieved on Oct. 17, 2008].

Moore, S. et al., "Format war pits HD-DVD against Blu-ray disc", Modern Plastics International, McGraw-Hill, Inc., Lausanne, Switzerland, Jan. 1, 2004, pp. 28-31.

Flaherty, N., "Battle of the Blues", IEE Review, IEE, UK, vol. 50, No. 4, Apr. 2004, pp. 48-50.

* cited by examiner

FIG.12A
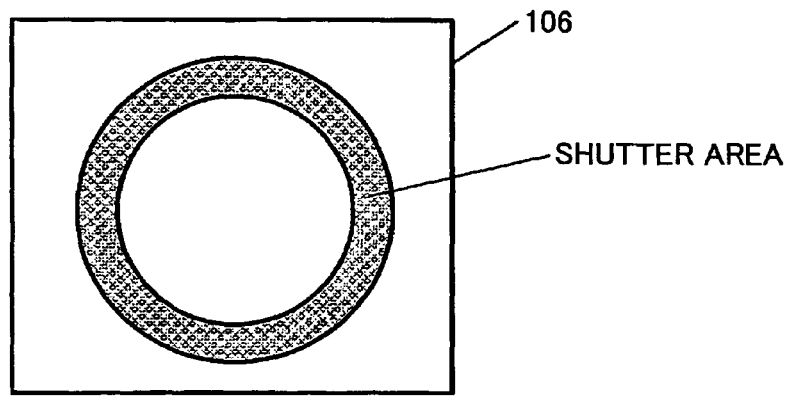
FIG.12B          FIG.12C
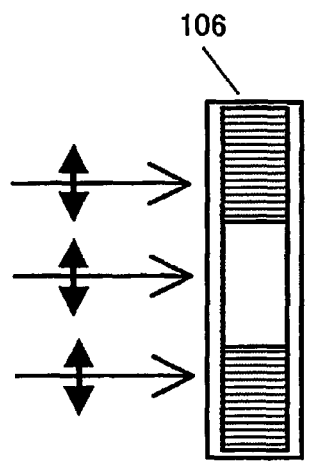    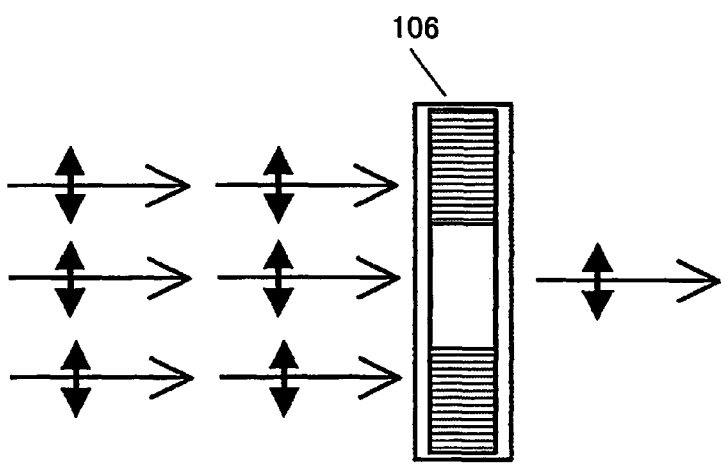
LIQUID CRYSTAL: OFF      LIQUID CRYSTAL: ON

FIG.14

| SURFACE | RDY (RADIUS OF CURVATURE) | THI (THICKNESS) | n(REFRACTIVE INDEX):405nm |
|---|---|---|---|
| OBJ | INFINITY | INFINITY | |
| S1 | 15.52 | 2.00 | 1.53 |
| S2 | -24.01 | 3.55 | |
| S3 | -15.67 | 1.00 | 1.80 |
| S4 | 37.12 | 5.00 | |
| S5 (STO) | INFINITY | 0.6 | 1.72 |
| S6 | INFINITY | 0.0 | |
| S6 | DIFFRACTION ORDER 0TH ORDER / 1ST ORDER (NOTE 1) DIFFRACTION SURFACE COEFFICIENTS $C1: 8.0361 \times 10^{-3}$  $C2: -8.8252 \times 10^{-4}$  $C3: -1.0901 \times 10^{-03}$ $C4: -6.8601 \times 10^{-5}$  $C5: -3.8433 \times 10^{-6}$ | | |
| S7 | 1.38 | 2.38 | 1.72 |
| S7 | ASPHERIC COEFFICIENTS OF LENS SURFACE $K: -0.671973$ $A: 0.108576 \times 10^{-1}$  $B: 0.887024 \times 10^{-3}$  $C: 0.615641 \times 10^{-3}$ $D: 0.305477 \times 10^{-3}$  $E: -.235521 \times 10^{-3}$  $F: 0.954484 \times 10^{-5}$ $G: 0.403964 \times 10^{-4}$  $H: 0.599180 \times 10^{-5}$  $J: -.871198 \times 10^{-5}$ | | |
| S8 | -4.24 | -0.43/0.15 (NOTE 1) | |
| S8 | ASPHERIC COEFFICIENTS OF LENS SURFACE $K: 15.973519$ $A: 0.265234$  $B: -.165180$  $C: -.762341 \times 10^{-1}$ $D: 0.119223$  $E: 0.102416 \times 10^{-1}$  $F: -.146044 \times 10^{-2}$ $G: -.528214 \times 10^{-2}$  $H: -.300544 \times 10^{-2}$  $J: 0.292188 \times 10^{-2}$ | | |
| S9 | INFINITY | 0.1/0.6 (NOTE 1) | 1.53 |
| S10 | INFINITY | 0.0 | |
| EPD:ENTRANCE PUPIL DIAMETER(mm) | 3.0/2.3 (NOTE 1) | | |
| WL:WAVELENGTH(nm) | 405 | | |

NOTE 1. 〖/〗 MEANS THE ORDER OF FIRST BLUE-RAY OPTICAL RECORDING MEDIUM /SECOND BLUE-RAY OPTICAL RECORDING MEDIUM.

FIG.16

| SURFACE | RDY (RADIUS OF CURVATURE) | THI (THICKNESS) | n(REFRACTIVE INDEX):405nm |
|---|---|---|---|
| OBJ | INFINITY | INFINITY | |
| S1 (STO) | INFINITY | 0.6 | |
| S2 | 1.38 | 2.38 | 1.72 |
| | DIFFRACTION ORDER 0TH ORDER / 1ST ORDER (NOTE 1) DIFFRACTION SURFACE COEFFICIENTS $C1: 2.7423 \times 10^{-2}$  $C2: 1.0502 \times 10^{-3}$  $C3: -5.9391 \times 10^{-4}$ $C4: -3.7025 \times 10^{-4}$  $C5: 1.2757(-4)$ | | |
| | ASPHERIC COEFFICIENTS OF LENS SURFACE $K: -6.6426 \times 10^{-1}$ $A: 1.0604 \times 10^{-2}$  $B: 2.1601 \times 10^{-3}$  $C: 6.0889 \times 10^{-5}$ $D: 4.8057 \times 10^{-4}$  $E: -7.7885 \times 10^{-5}$  $F: 4.7808 \times 10^{-5}$ | | |
| S3 | -4.80 | -0.43/0.29 (NOTE 1) | |
| | ASPHERIC COEFFICIENTS OF LENS SURFACE $K: 12.516971$ $A: 0.279855$  $B: -.141274$  $C: -.250439 \times 10^{-1}$ $D: 0.108911$  $E: -.801930 \times 10^{-1}$  $F: -.146045 \times 10^{-2}$ $G: -.528214 \times 10^{-2}$  $H: -.300544 \times 10^{-2}$  $J: 0.292188 \times 10^{-2}$ | | |
| S4 | INFINITY | 0.1/0.6 (NOTE 1) | 1.53 |
| S5 | INFINITY | 0.0 | |
| EPD:ENTRANCE PUPIL DIAMETER(mm) | | 3.0/2.3 (NOTE 1) | |
| WL:WAVELENGTH(nm) | | 405 | |

NOTE 1. 『/』 MEANS THE ORDER OF FIRST BLUE-RAY OPTICAL RECORDING MEDIUM /SECOND BLUE-RAY OPTICAL RECORDING MEDIUM.

FIG.20

| SURFACE | RDY (RADIUS OF CURVATURE) | THI (THICKNESS) | n(REFRACTIVE INDEX):405nm |
|---|---|---|---|
| OBJ | INFINITY | INFINITY | |
| S1 | 7.56 | 2.0 | 1.53 |
| | ASPHERIC COEFFICIENTS OF LENS SURFACE<br>K:0.972983<br>A:0.371207 × 10^(−3)  B:−.478667 × 10^(−4)  C : −.901945 × 10^(−5)<br>D:−.814374 × 10^(−6) | | |
| S2 | 40.91 | 2/4.1 (NOTE 1) | |
| | ASPHERIC COEFFICIENTS OF LENS SURFACE<br>K:−76.180141<br>A:−.551113 × 10^(−3)  B:−.604159 × 10^(−4)  C : −.264014 × 10^(−4)<br>D:0.307055 × 10^(−7) | | |
| S3 | −3.54 | 1.7 | 1.80 |
| | ASPHERIC COEFFICIENTS OF LENS SURFACE<br>K:−0.031141<br>A:0.286777 × 10^(−3)  B:−.248176 × 10^(−3)  C : −.146269 × 10^(−4)<br>D:−.160400 × 10^(−4) | | |
| S4 | −4.35 | 0.0 | |
| | ASPHERIC COEFFICIENTS OF LENS SURFACE<br>K:−0.751196<br>A:−.557062 × 10^(−4)  B:−.818406 × 10^(−4)  C : −.451735 × 10^(−4)<br>D:0.195625 × 10^(−5) | | |
| S5 (STO) | INFINITY | 0.6 | 1.72 |
| S6 | 1.90 | 2.90 | 1.72 |
| | ASPHERIC COEFFICIENTS OF LENS SURFACE<br>K:−0.638807<br>A:0.515357 × 10^(−2)  B:0.536542 × 10^(−3)  C : 0.155822 × 10^(−4)<br>D:0.693345 × 10^(−5)  E:−.144620 × 10^(−4)  F : −.464699 × 10^(−7)<br>G:0.607353 × 10^(−6)  H:0.816724 × 10^(−7)  J : −.863344 × 10^(−7) | | |
| S7 | −5.49 | 0.51/0.12 (NOTE 1) | |
| | ASPHERIC COEFFICIENTS OF LENS SURFACE<br>K:27.747443<br>A:0.181893          B:−.209173          C : 0.152146<br>D:−.292109 × 10^(−1)  E:0.432555 × 10^(−3)  F : −.346960 × 10^(−4)<br>G:−.705877 × 10^(−4)  H:−.225917 × 10^(−4)  J : 0.123545 × 10^(−4) | | |
| S8 | INFINITY | 0.1/0.6 (NOTE 1) | 1.53 |
| S9 | INFINITY | 0.0 | |
| EPD:ENTRANCE PUPIL DIAMETER (mm) | 3.8/2.3 (NOTE 1) | | |
| WL:WAVELENGTH (nm) | 405 | | |

NOTE 1. 〚/〛 MEANS THE ORDER OF FIRST BLUE-RAY OPTICAL RECORDING MEDIUM /SECOND BLUE-RAY OPTICAL RECORDING MEDIUM.

OPTICAL PICK-UP, METHOD OF GENERATING ABERRATION FOR COMPENSATION AND OPTICAL INFORMATION PROCESSING APPARATUS USING THE SAME

TECHNICAL FIELD

The present invention relates to an optical pick-up and a method of generating aberration for compensation, which perform at least one of recording, reproducing and erasing information for plural kinds of optical recording media or a multi-layer optical recording medium, and an optical information processing apparatus using the same.

BACKGROUND ART

An optical recording medium such as a CD with a recording capacity of 0.65 GB and a DVD with a recording capacity of 4.7 GB as a medium for storing video information, audio information, or data on a computer is spreading among people. Then, recently and continuing, there is rising demand for further increasing the recording density and the capacity.

As a method for increasing the recording density of such an optical recording medium, it is effective to increase the numerical aperture (referred to as NA, below) of an objective lens or to shorten the wavelength for a light source in an optical pick-up for performing writing or calling of information for the optical recording medium, so that the diameter of a beam spot focused by the objective lens decreases which spot is formed on the optical recording medium. Accordingly, for example, while the NA of the objective lens and the wavelength for the light source are defined as 0.50 and 780 nm, respectively, for a "CD-type optical recording medium", the NA of the objective lens and the wavelength for the light source are defined as 0.65 and 660 nm, respectively, for a "DVD-type optical recording medium" having recording density higher than that of the "CD-type optical recording medium". Then, further increase of the recording density and capacity of the optical recording medium is desired as described above, and therefore, it is desired to make the NA of the objective lens be greater than 0.65 or to make the wavelength of the light source be less than 660 nm.

For such a high-capacity optical recording medium and an optical information processing apparatus, two specifications are proposed. One of them is a "Blue-Ray Disc" specification which satisfies the ensuring of a capacity of approximately 22 GB using a source of light in a blue wavelength region and an objective lens with an NA of 0.85 as disclosed in Masuo Oku et al., "The goal of Blue-ray Disc", Nikkei Electronics, pp. 135-150 (2003.03.31). The other is a "HD DVD" specification which satisfies the ensuring of a capacity of approximately 20 GB using a similar blue wavelength region and an objective lens with an NA of 0.65, as disclosed in Naoshi Yamada et al., "a next-generation specification derived from a DVD, "HD DVD"", Nikkei Electronics, pp. 125-134 (2003.10.13).

The former attains the capacity increase due to modifications such as the employment of wavelength shorter than that of DVD-type and a higher NA and the latter attains the capacity increase due to ingenious signal processing to allow the increase of linear recording density and the employment of land-groove recording to reduce a track pitch, instead of the employment of a higher NA.

As described above, the two specifications using the source of light within a blue wavelength region are proposed. However, it is desirable for a user to treat the optical recording media in accordance with the two specifications without distinction in a single optical information processing apparatus. As the simplest method for realizing it, there is provided a method of mounting plural optical pick-ups. However, it is difficult for this method to achieve miniaturization and reduced cost. Therefore, an optical pick-up that can perform recording or reproducing with a common light source and a common objective lens for the two blue-specifications is desired. However, the generation of aberration caused by tilt (inclination) of the optical recording medium or a thickness error of a transparent substrate is known as a problem of such an optical pick-up. The problem is such that the margins of the thickness error and the tilt are lowered in the case of shortening the wavelength for a light source and increasing the numerical aperture of an objective, that is, attaining higher density due to the reduction of the spot diameter of light focused on the optical recording medium.

First, spherical aberration caused by a thickness error of a transparent substrate of the optical recording medium is described. As the spherical aberration occurs, a spot formed on an information-recording surface of the optical recording medium deteriorates and, therefore, a normal operation for recording or reproducing cannot be carried out. Generally, spherical aberration caused by a thickness error of a transparent substrate of an optical recording medium is given by the following mathematical formula 1, $$W40 \text{ rms} \approx \frac{1}{48\sqrt{5}} \cdot \frac{n^2-1}{n^3} \cdot NA^4 \cdot \frac{\Delta t}{\lambda}$$

wherein $\lambda$ is a used wavelength, NA is the numerical aperture of an objective lens, n is an equivalent refractive index of the optical recording medium, and $\Delta t$ is a shift along the direction of the optical axis from a spot position at which the spherical aberration is the minimum.

FIG. 1A shows respective aberration quantities caused by a substrate thickness error of the first optical recording medium with an NA of 0.85, a substrate thickness of 0.1 mm, and a used wavelength of 405 nm. In the figure, SA is spherical aberration, COMA is coma aberration, TOTAL is total amount of these secondary aberrations, and STREHL is the peak intensity of a spot. FIG. 1B shows respective aberration quantities caused by a substrate thickness error of the second optical recording medium with an NA of 0.65, a substrate thickness of 0.6 mm, and a used wavelength of 405 nm.

Commonly, the tolerance of W40 rms is necessarily half or less of approximately 0.07 $\lambda$rms, since it is empirically known that the quantity of wavefront aberration is necessarily smaller than Marechal's criterion (0.07 $\lambda$rms) in reading a signal from an optical recording medium and it is necessary to also include aberration of an objective lens and aberration caused by tilt of the optical recording-medium when the wavefront aberration is considered. Also, for a substrate thickness error of an optical recording medium, a molding tolerance of approximately $\pm 10$ μm is necessarily considered; therefore, compensation is needed for the first optical recording medium.

Second, coma aberration caused by tilt (inclination) of an optical recording medium is described. As the coma aberration occurs, a spot formed on an information-recording surface of the optical recording medium deteriorates and, therefore, a normal operation for recording or reproducing cannot be carried out. Generally, coma aberration caused by tilt of an optical recording medium is given by the following mathematical formula 2, $$W31\ \mathrm{rms} \approx \frac{n^2-1}{2n^3} \cdot d \cdot NA^3 \cdot \frac{\theta}{\lambda}$$

wherein n is the refractive index of a transparent substrate of the optical recording medium, d is the thickness of the transparent substrate, NA is the numerical aperture of an objective lens, λ is the wavelength for a light source, and θ is a tilt quantity of the optical recording medium.

FIG. 2A shows respective aberration quantities caused by tilting of the first optical recording medium in an optical system with an NA of 0.85, a substrate thickness of 0.1 mm, and a used wavelength of 405 nm. Similarly, FIG. 2B shows respective aberration quantities caused by tilting of the second optical recording medium in an optical system with an NA of 0.65, a substrate thickness of 0.6 mm, and a used wavelength of 405 nm.

Commonly, the tolerance of W40 rms is necessarily half or less of approximately 0.07 λrms, since it is empirically known that the quantity of wavefront aberration is necessarily smaller than Marechal's criterion (0.07 λrms) in reading a signal from an optical recording medium and it is necessary to also include aberration of an objective lens and aberration caused by a thickness error of the optical recording medium when the wavefront aberration is considered. Also, for the tolerance of manufacturing the optical recording medium and the precision of mounting the optical recording medium, the occurrence of tilt of approximately 0.3 degrees is necessarily considered; therefore, compensation is needed for the second optical recording medium.

As described above, it is necessary to compensate for the spherical aberration caused by a substrate thickness error of the first optical recording medium and the coma aberration caused by tilting of the second optical recording medium in an optical pick-up to perform recording or reproducing for both the first optical recording medium and the second optical recording medium. For the compensation, it is necessary to detect and dynamically compensate for the quantity of generated aberrations, but the simultaneous compensation of the coma aberration and the spherical aberration requires complex control. Also, to provide both a coma aberration compensation element and a spherical aberration compensation element causes an increase of both the number of components and the size of the optical pick-up.

DISCLOSURE OF THE INVENTION

Problems to be Solved by the Invention

One of the objects of the present invention is to provide an optical pick-up and a method of generating aberration for compensation which allows tilt compensation by coma aberration generated by an aberration generation device provided between a light source and an objective lens based on a value detected by a tilt detecting device in an optical recording medium, and an optical information processing apparatus using it.

Another object of the present invention is to provide an optical pick-up and a method of generating aberration for compensation which can simply and reliably compensate for each of spherical aberration caused by a substrate thickness error of the first blue-ray optical recording medium and coma aberration caused by tilt of the second blue-ray optical recording medium, and an optical information processing apparatus using it.

Yet another object of the present invention is to provide an optical pick-up and a method of generating aberration for compensation, which can compensate for two kinds of aberrations, that is, spherical aberration and coma aberration, with only one compensation element, and an optical information processing apparatus using it.

Means for Solving the Problem

One of the objects of the present invention can be achieved by an optical pick-up to perform recording or reproducing for an optical recording medium, including
  a light source configured to emit a light beam,
  an objective lens configured to focus the light beam onto the optical recording medium, and
  an aberration generation device provided between the light source and the objective lens, configured to generate coma aberration for the beam focused by the objective lens, based on a detected value from a device configured to detect a degree of tilt of the optical recording medium,
  wherein the tilt is compensated for by the coma aberration generated by the aberration generation device.

One of the objects of the present invention can be achieved by an optical pick-up to perform recording or reproducing of information for a first optical recording medium with a wavelength λ1, a thickness t1 of a substrate thereof, and a numerical aperture NA1 for use thereof and a second optical recording medium with a wavelength λ1, a thickness t2 (>t1) of a substrate thereof, and a numerical aperture NA2 (<NA1) for use thereof, including
  an aberration generation device configured to generate coma aberration or spherical aberration for a beam focused by an objective lens,
  a device configured to perform a first control operation including
    a first step of making a quantity of the coma aberration generated by the aberration generation device be a stored and predetermined value when a medium determination device configured to determine which of the first and second optical recording media is set determines that the first optical recording medium is set,
    a second step of changing a quantity of the spherical aberration generated by the aberration generation device to store a driving condition of the aberration generation device on which condition an amplitude of a recording information signal or a track error signal is maximum, and
    a third step of performing an operation of recording or reproducing while a quantity of the spherical aberration is added based on the driving condition, and
  a device configured to perform a second control operation including
    a fourth step of making a quantity of the spherical aberration generated by the aberration generation device be a stored and predetermined value when the medium determination device determines that the second optical recording medium is set,
    a fifth step of changing a quantity of the coma aberration generated by the aberration generation device, to store a driving condition of the aberration generation device on which condition an amplitude of a recording information signal or a track error signal is maximum, and
    a sixth step of performing an operation of recording or reproducing while the quantity of the coma aberration is added based on the driving condition,
  wherein the aberration generation device is controlled by the device for the first and second control operations.

One of the objects of the present invention can be achieved by an optical pick-up to perform recording or reproducing of information for an optical recording medium in which p layers ($p \geq 2$) each with an information-recording surface are formed in a direction of a thickness thereof of which layers (p-q) layer(s) at a front side near an objective lens is/are an information recording layer(s) with high recording density and q layer(s) at a back side away from the objective lens is/are an information recording layer(s) with low recording density, including an aberration generation device configured to generate coma aberration or spherical aberration for a beam focused by the objective lens, a device configured to perform a first control operation including a first step of making a quantity of the coma aberration generated by the aberration generation device be a stored and predetermined value when recording or reproducing of information is performed for the (p-q) layer(s) of the optical recording medium at the front side near the objective lens, a second step of changing a quantity of the spherical aberration generated by the aberration generation device to store a driving condition of the aberration generation device on which condition an amplitude of a recording information signal or a track error signal is maximum, and a third step of performing an operation of recording or reproducing while a spherical aberration is added based on the driving condition, and a device configured to perform a second control operation including a fourth step of making a quantity of the spherical aberration generated by the aberration generation device be a stored and predetermined value when recording or reproducing of information is performed for the q layer(s) of the optical recording medium at the back side away from the objective lens, a fifth step of changing a quantity of the coma aberration generated by the aberration generation device to store a driving condition of the aberration generation device on which condition an amplitude of a recording information signal or a track error signal is maximum, and a sixth step of performing an operation of recording or reproducing while coma aberration is added based on the driving condition, wherein control of the aberration generation device is performed by the device configured to perform the first and second control operations.

One of the objects of the present invention can be achieved by a method of generating aberration for compensation for an optical pick-up to perform recording or reproducing for an optical recording medium, wherein a light beam emitted from a light source is focused on the optical recording medium through an objective lens and coma aberration is generated for a beam focused by the objective lens, based on a detected value from a tilt quantity detecting device for the optical recording medium, by an aberration generation device provided between the light source and the objective lens, so as to perform tilt-compensation based on a quantity of the generated coma aberration.

One of the objects of the present invention can be achieved by a method of generating aberration for compensation for an optical pick-up to perform recording or reproducing of information for a first optical recording medium with a wavelength $\lambda 1$, a thickness t1 of a substrate thereof and a numerical aperture NA1 for use thereof and a second optical recording medium with a wavelength $\lambda 1$, a thickness t2 ($>$t1) of a substrate thereof, and a numerical aperture NA2 ($<$NA1) for use thereof, which performs, as a control of an aberration generation device configured to generate coma aberration or spherical aberration for a beam focused by an objective lens, a first control operation including a first step of making a quantity of the coma aberration generated by the aberration generation device be a stored and predetermined value when a medium determination device configured to determine which of the first and second optical recording media is set determines that the first optical recording medium is set, a second step of changing a quantity of the spherical aberration generated by the aberration generation device to store a driving condition of the aberration generation device on which condition an amplitude of a recording information signal or a track error signal is maximum, and a third step of performing an operation of recording or reproducing while a quantity of the spherical aberration is added based on the driving condition, and a second control operation including a fourth step of making a quantity of the spherical aberration generated by the aberration generation device be a stored and predetermined value when the medium determination device determines the second optical recording medium, a fifth step of changing a quantity of the coma aberration generated by the aberration generation device, to store a driving condition of the aberration generation device on which condition an amplitude of a recording information signal or a track error signal is maximum, and a sixth step of performing an operation of recording or reproducing while the quantity of the coma aberration is added based on the driving condition.

One of the objects of the present invention can be achieved by a method of generating aberration for compensation for an optical pick-up to perform recording or reproducing of information for an optical recording medium in which p layers ($p \geq 2$) each with an information-recording surface are formed in a direction of a thickness thereof of which layers (p-q) layer(s) at a front side near an objective lens is/are an information recording layer(s) with high recording density and q layer(s) at a back side away from the objective lens is/are an information recording layer(s) with low recording density, which performs, as a control of an aberration generation device configured to generate coma aberration or spherical aberration for a beam focused by the objective lens, a first control operation including a first step of making a quantity of the coma aberration generated by the aberration generation device be a stored and predetermined value when recording or reproducing of information is performed for the (p-q) layer(s) of the optical recording medium at the front side near the objective lens, a second step of changing a quantity of the spherical aberration generated by the aberration generation device to store a driving condition of the aberration generation device on which condition an amplitude of a recording information signal or a track error signal is maximum, and a third step of performing an operation of recording or reproducing while a spherical aberration is added based on the driving condition, and a second control operation including a fourth step of making a quantity of the spherical aberration generated by the aberration generation device be a stored and predetermined value when recording or reproducing of information is performed for the q layer(s) of the optical recording medium at the back side away from the objective lens, a fifth step of changing a quantity of the coma aberration generated by the aberration generation device to store a driving condition of the aberration generation device on which condition an amplitude of a recording information signal or a track error signal is maximum, and a sixth step of performing an operation of recording or reproducing while coma aberration is added based on the driving condition.

One of the objects of the present invention can be achieved by an optical information processing apparatus to perform recording or reproducing of information for an optical recording medium, wherein the optical pick-up as claimed in claim 1 is provided.

One of the objects of the present invention can be achieved by an optical information processing apparatus to perform recording or reproducing of information for an optical recording medium, wherein the method of generating aberration for compensation as claimed in claim 21 is used.

Advantageous Effect of the Invention

According to one aspect of the present invention, tilt compensation is allowed by coma aberration generated based on a detected value from a tilt detecting device in an optical recording medium.

According to another aspect of the present invention, each of spherical aberration caused by a substrate thickness error of the first blue-ray optical recording medium and coma aberration caused by tilt of the second blue-ray optical recording medium can be simply and reliably compensated for.

According to another aspect of the present invention, two kinds of aberrations, that is, spherical aberration and coma aberration can be compensated for by only one compensation element.

BRIEF DESCRIPTION OF THE DRAWINGS

FIG. 12A is a front view of an aperture-limiting element using a liquid crystal element.

FIG. 12B is a diagram showing transmitted light when a liquid crystal element is turned off.

FIG. 12C is a diagram showing transmitted light when a liquid crystal element is turned on.

FIG. 14 is a table showing an example of numerical values for an optical system shown in FIG. 13.

FIG. 16 is a table showing an example of numerical values for an optical system shown in FIG. 15.

FIG. 20 is a table showing an example of numerical values for the optical system shown in FIG. 19.

EXPLANATION OF LETTERS OR NUMERALS

Figure 1A:
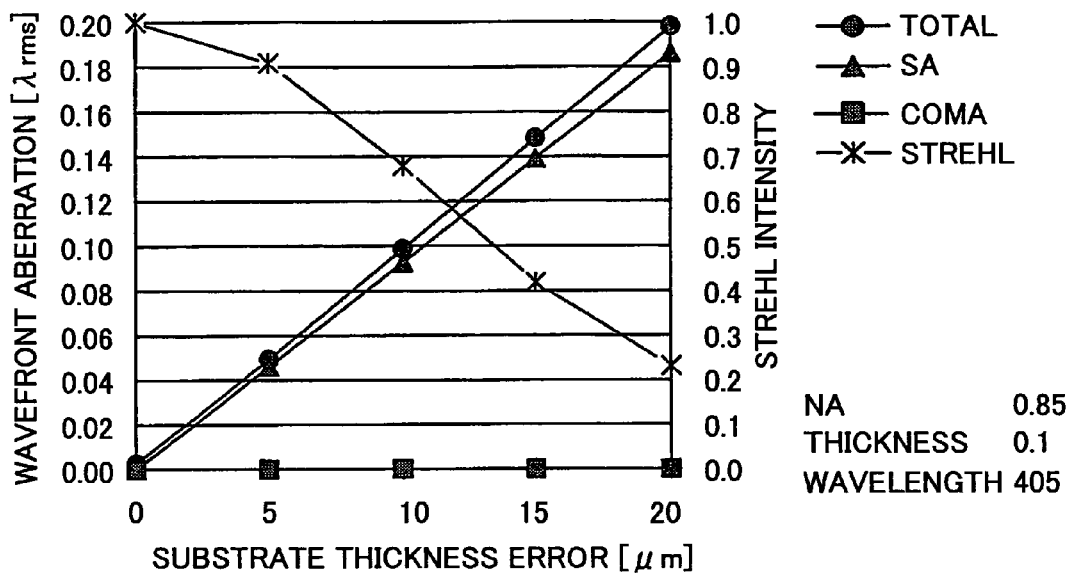
FIG. 1A is a characteristic diagram of wavefront aberration on the first blue-ray optical recording medium caused by a substrate thickness error of the optical recording medium.

101: Semiconductor laser
102: Collimator lens
103: Polarizing beam splitter
104, 104': Aberration compensation optical systems
104a, 104a, 104b, 104b': Lenses
105: Deflection prism
106: Liquid crystal aperture-limiting element
107: Aberration compensation diffraction element
107': Liquid crystal aberration compensation element
108: Quarter-wave plate
109: Objective lens
110: Optical recording medium
110a: First blue-ray optical recording medium
110b: Second blue-ray optical recording medium
111: Detection lens
112: Light-receiving element
121, 122: Actuator
123: Spherical aberration (SA) compensation driver
124: Tilt compensation driver
125: CPU
126: RF signal generation part
127: TE signal generation part
128: Peak-hold circuit
211, 212, 213, 214: Information recording layers
301: Optical pick-up
302: Feeding motor
303: Spindle motor
304: Servo control circuit
305: Modem circuit
306: External circuit
307: System controller

BEST MODE FOR CARRYING OUT THE INVENTION

Embodiments of the present invention are described in detail below, with reference to the drawings.

Figure 3:
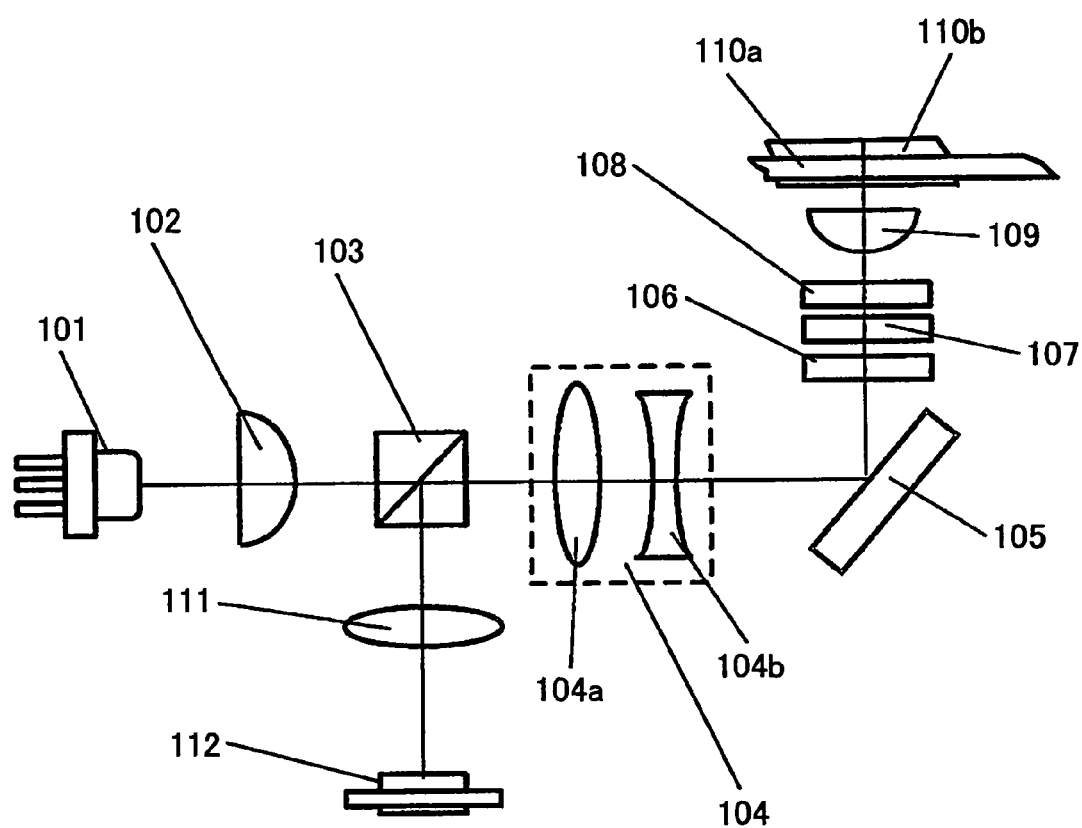
FIG. 3 is a schematic diagram showing the structure of an optical pick-up in embodiment 1 of the present invention.

FIG. 3 is a schematic diagram showing the structure of an optical pick-up in embodiment 1 of the present invention. As embodiment 1, an example of an optical pick-up that can perform recording or reproducing for the "first blue-ray optical recording medium with a used wavelength of 405 nm, an NA of 0.85, and a substrate thickness of 0.1 mm at the side of light irradiation" and the "second blue-ray optical recording medium with a used wavelength of 405 nm, an NA of 0.65, and a substrate thickness of 0.6 mm at the side of light irradiation" is described.

Figure 1B:
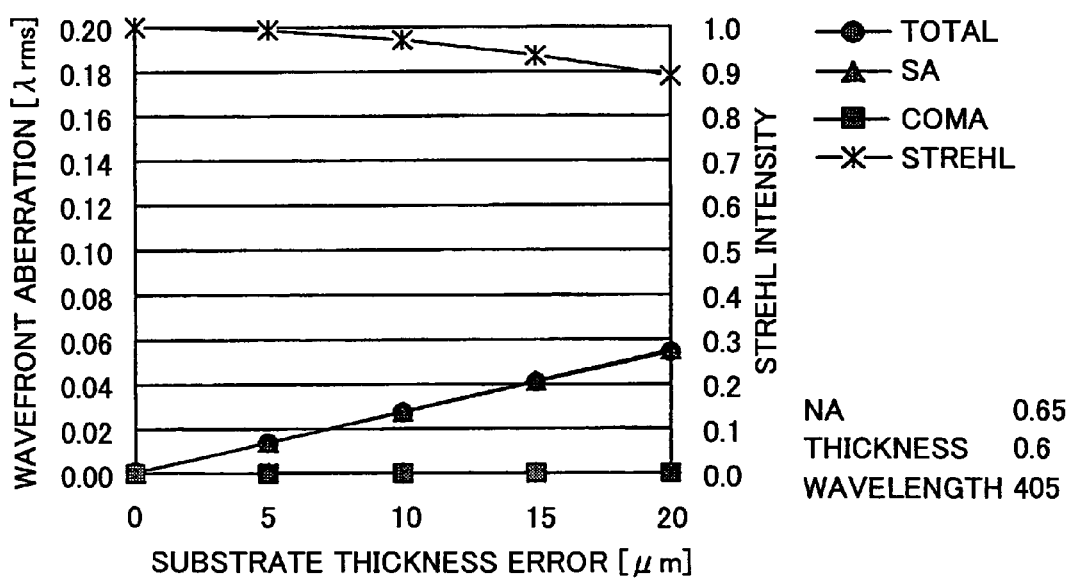
FIG. 1B is a characteristic diagram of wavefront aberration on the second blue-ray optical recording medium caused by a substrate thickness error of the optical recording medium.
Figure 2A:
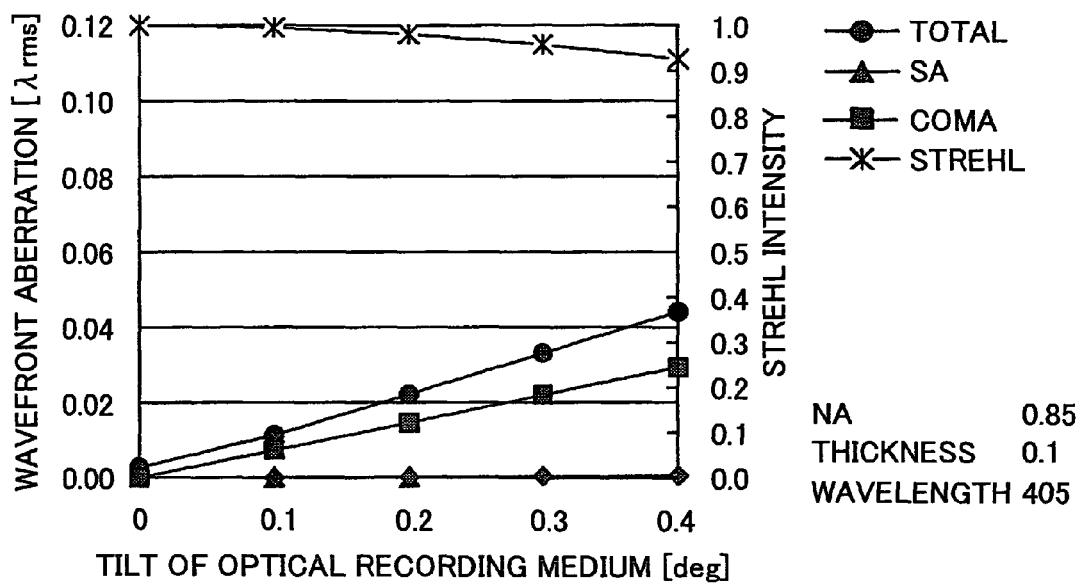
FIG. 2A is a characteristic diagram of wavefront aberration on the first blue-ray optical recording medium caused by tilt of the optical recording medium.
Figure 2B:
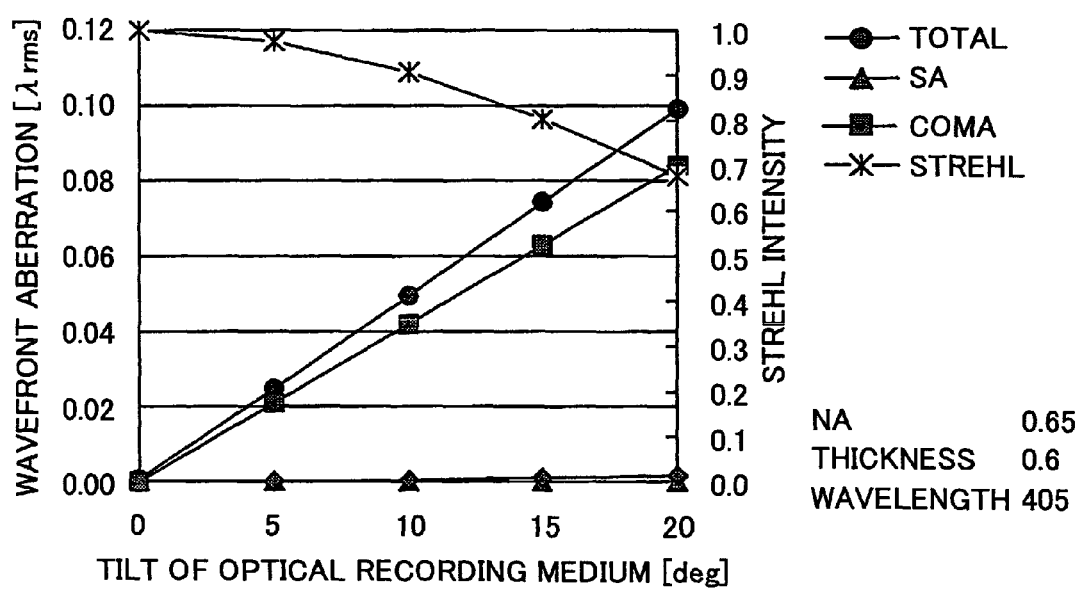
FIG. 2B is a characteristic diagram of wavefront aberration on the second blue-ray optical recording medium caused by tilt of the optical recording medium.

The principal part of the optical pick-up shown in FIG. 1 is composed of a semiconductor laser 101 for a wavelength of 405 nm, a collimator lens 102, a polarizing beam splitter 103, an aberration compensation optical system 104, a deflection prism 105, a liquid crystal aperture-limiting element 106, an aberration compensation diffraction element 107, a quarter-wave plate 108, an objective lens 109, a detection lens 111, and a light-receiving element 112. Herein, the objective lens 109 is designed such that wavefront aberration in an infinite system is the minimum for the "first blue-ray optical recording medium with a used wavelength of 405 nm, an NA of 0.85, and a substrate thickness of 0.1 mm at the side of light irradiation". Usually, it is more difficult for an NA of 0.85 to obtain a desired characteristic than it is for an NA of 0.65, since the higher the NA of an objective lens becomes, the stricter the tolerance becomes, and therefore, an aspherical lens of which aberrations are corrected at an NA of 0.85 is particularly used.

Also, optical recording media 110a, 110b have substrate thicknesses different from each other, wherein the first blue-ray optical recording medium 110a has a substrate thickness of 0.1 mm and the second blue-ray optical recording medium 110b has a substrate thickness of 0.6 mm. At the time of recording or reproducing, only one of the optical recording media is set on a rotation mechanism that is not shown in the figure and rotates at high speed.

First, the case of recording or reproducing for the "first blue-ray optical recording medium with a used wavelength of 405 nm, an NA of 0.85, and a substrate thickness of 0.1 mm at the side of light irradiation" is described. Divergent light with a wavelength of 405 nm and a linear polarization emitted from the semiconductor laser 101 is approximately collimated through the collimator lens 102, and transmitted through the polarizing beam splitter 103 and the aberration compensation optical system 104. Then, the optical path of the light is deflected by 90 degrees by the deflection prism 105, and the light is insensitively transmitted through the liquid crystal aperture-limiting element 106 and the aberration compensation diffraction element 107, transmitted through the quarter-wave plate 108 to become circularly polarized light, enters the objective lens 109, and is focused into a micro-spot on the first blue-ray optical recording medium 110a. The recording, reproducing, or erasing of information is performed using the spot. The light reflected from the first blue-ray optical recording medium 110a becomes circularly polarized light with rotation direction opposing that in the forward route, is approximately collimated again, passes though the quarter-wave plate 108 to become light with linear polarization orthogonal to that in the forward route, is reflected by the polarizing beam splitter 103, becomes converging light through the detection lens 111, and is led to the light-receiving element 112. An information signal and a servo signal are generated from the light-receiving element 112.

Next, the case of recording or reproducing for the "second blue-ray optical recording medium with a used wavelength of 405 nm, an NA of 0.65, and a substrate thickness of 0.6 mm at the side of light irradiation" is described. Divergent light with a wavelength of 405 nm and a linear polarization emitted from the semiconductor laser 101 is approximately collimated through the collimator lens 102, and transmitted through the polarizing beam splitter 103 and the aberration compensation optical system 104. Then, the optical path of the light is deflected by 90 degrees by the deflection prism 105 and the NA of the light is limited to 0.65 by the liquid crystal aperture-limiting element 106. Then, the light is provided with a predetermined spherical aberration, enters the objective lens 109, and is focused into a micro-spot on the second blue-ray optical recording medium 110b. The recording, reproducing, or erasing of information is performed using the spot. The light reflected from the second blue-ray optical recording medium 110b becomes circularly polarized light with rotation direction opposing that in the forward route, is approximately collimated again, passes though the quarter-wave plate 108 to become light with linear polarization orthogonal to that in the forward route, is reflected by the polarizing beam splitter 103, becomes converging light through the detection lens 111, and is led to the light-receiving element 112. An information signal and a servo signal are generated from the light-receiving element 112.

The structure of the aforementioned aberration compensation optical system 104 is described. The aberration compensation optical system 104 is composed of two lenses and two groups, which lenses are a lens 104a at the side of the semiconductor laser 101 as a light source and lens 104b at the side of the optical recording medium 110. Then, the lens 104a has positive power, the lens 104b is has negative power, and both lenses are single lenses. Further, both lenses are arranged in the optical path of light emitted from the semiconductor laser 101 and directed to the optical recording medium 110.

Figure 4:
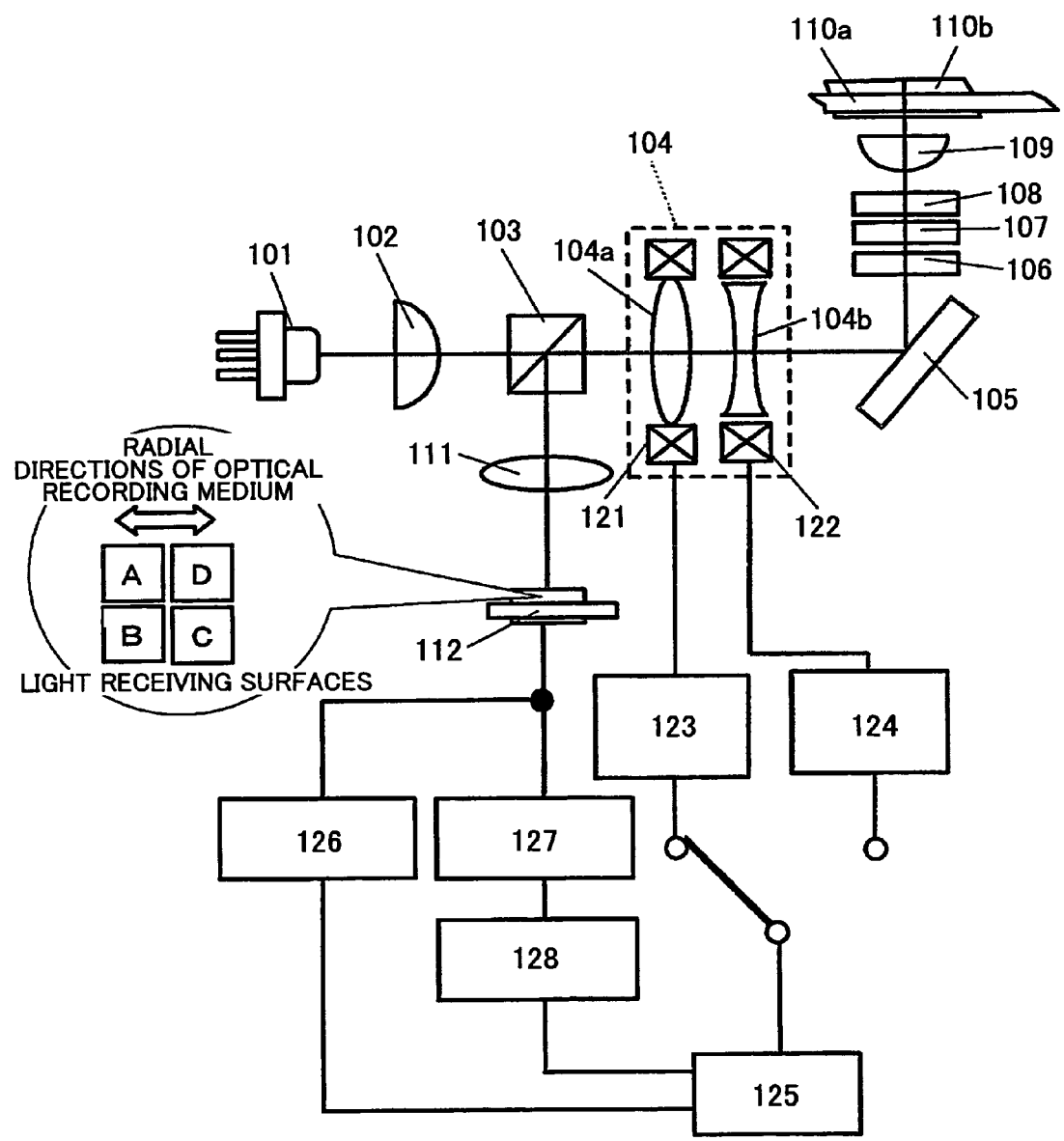
FIG. 4 is a diagram showing a circuit for compensating for spherical aberration and coma aberration in an aberration compensation optical system of an optical pick-up in embodiment 1 of the present invention.

For the first blue-ray optical recording medium 110a, the aberration compensation optical system 104 is mounted on a driving device as shown in FIG. 4 and detects the quantity of deteriorative spherical aberration caused by a substrate thickness error of the medium and dynamically controls the lenses of the aberration compensation optical system 104, so that the optimum characteristic can be obtained.

On the other hand, for the first blue-ray optical recording medium 110b, the aberration compensation optical system 104 detects the quantity of deteriorative coma aberration caused by tilt of the medium and dynamically controls the lenses of the aberration compensation optical system 104, so that the optimum characteristic can be obtained.

Now, a method for dynamically controlling the aberration compensation optical system 104, that is, a method for compensating for the spherical aberration or the coma aberration, is described below, with reference to FIG. 4. Additionally, the optical components in FIG. 4 are the same as those in FIG. 3. The lenses 104a, 104b which compose the aberration compensation optical system 104 are supported on actuators 121, 122 as a driving device for them. The actuator 121 is configured so that the lens 104a is uniaxially driven in the direction of the optical axis thereof. Accordingly, the space between the lens 104a and the lens 104b can be variable. Also, the actuator 122 is configured so that the lens 104b can be moved uniaxially in the direction orthogonal to the optical axis thereof, specifically, in the radial direction of the optical recording medium. Additionally, as a specific example of the actuator, a voice coil-type actuator, a piezo-actuator, etc., which are generally known, may be employed.

The actuators 121, 122 are connected to a CPU 125 through a spherical aberration (SA) compensation driver 123 and a tilt compensation driver 124, respectively. A signal from a track error signal generation part 127 (referred to as TE, below) is input to the CPU 125 through the peak hold circuit 128 and a signal from a recording information (referred to as RF, below) signal generation part 126 is input to the CPU 125. A compensation profile memory (not shown in the figure) is provided in the CPU 125.

A light-receiving surface of the light-receiving element 112 is divided into four areas as shown in FIG. 4 and detection signals Sa through Sd from respective detection surfaces A through D are provided to the TE signal generation part 127 and the RF signal generation part 126. The TE signal generation part 127 generates a TE signal according to mathematical formula 3, $$TE=(Sa+Sb)-(Sc+Sd),$$

using the detection signals Sa through Sd and provides the TE signal to the peak hold circuit 128.

The peak hold circuit 128 holds the peak level of the TE signal and provides the level to the CPU 125. Also, the RF signal generation part 126 generates a RF signal according to mathematical formula 4, $$RF=Sa+Sb+Sc+Sd,$$

using the detection signals Sa through Sd, and provides the RF signal to the CPU 125.

The CPU 125 performs a below-mentioned offset measurement process for measuring the difference between a lens position at which the amplitude of the TE signal is the maximum and a lens position at which the amplitude of the RF signal is the maximum using the TE signal received from the peak hold circuit 128 and the RF signal received from the RF signal generation part 126; a compensation profile creation process for creating a compensation profile, for example, for giving an instruction regarding spherical aberration compensation or coma aberration compensation for every medium using the offset quantity obtained by the measurement; and a compensation process for performing the correction of substrate thickness or spherical aberration compensation, according to the created compensation profile. That is, the lens 104a can be moved depending on the kind of optical recording medium.

Additionally, the aforementioned compensation profile may be such that the discal surface of an optical recording medium is divided along the radial direction thereof into three areas such as an inner area, a middle area, and an outer area and the optimum quantity of aberration compensation is determined for each of the areas.

Additionally, when the first blue-ray optical recording medium is an unrecorded medium, an aberration compensation quantity at which the amplitude of an RF signal is the maximum cannot be obtained since no RF signal is obtained at any position on the medium. Therefore, an aberration compensation quantity at which the amplitude of a TE signal is the maximum is used as an alternative value. However, the aberration compensation quantity at which the amplitude of an RF signal is the maximum and the aberration compensation quantity at which the amplitude of a TE signal is the maximum do not necessarily coincide and have an offset quantity between them. That is, for the unrecorded medium, the aberration compensation quantity at which the amplitude of a TE signal is the maximum is obtained, and an aberration compensation quantity at which the amplitude of an RF signal is the maximum is calculated from the aberration compensation quantity at which the amplitude of a TE signal is the maximum and the offset quantity, so as to set the optimum aberration quantity. Thus, the optimum aberration quantity can be determined so as to create a compensation profile for an unrecorded medium as well as a recorded medium.

Figure 5:
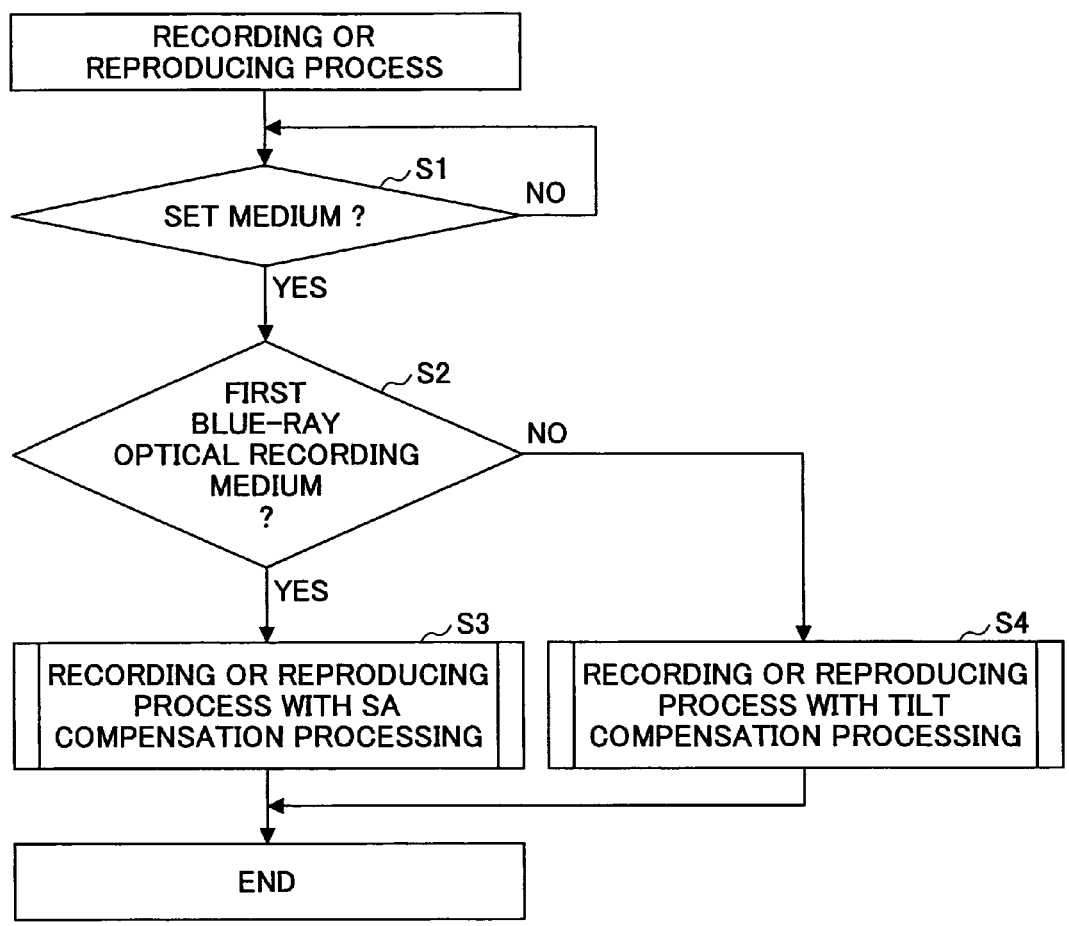
FIG. 5 is a flowchart showing compensation processes in recording or reproducing processes of an optical pick-up in embodiment 1 of the present invention.
Figure 6:
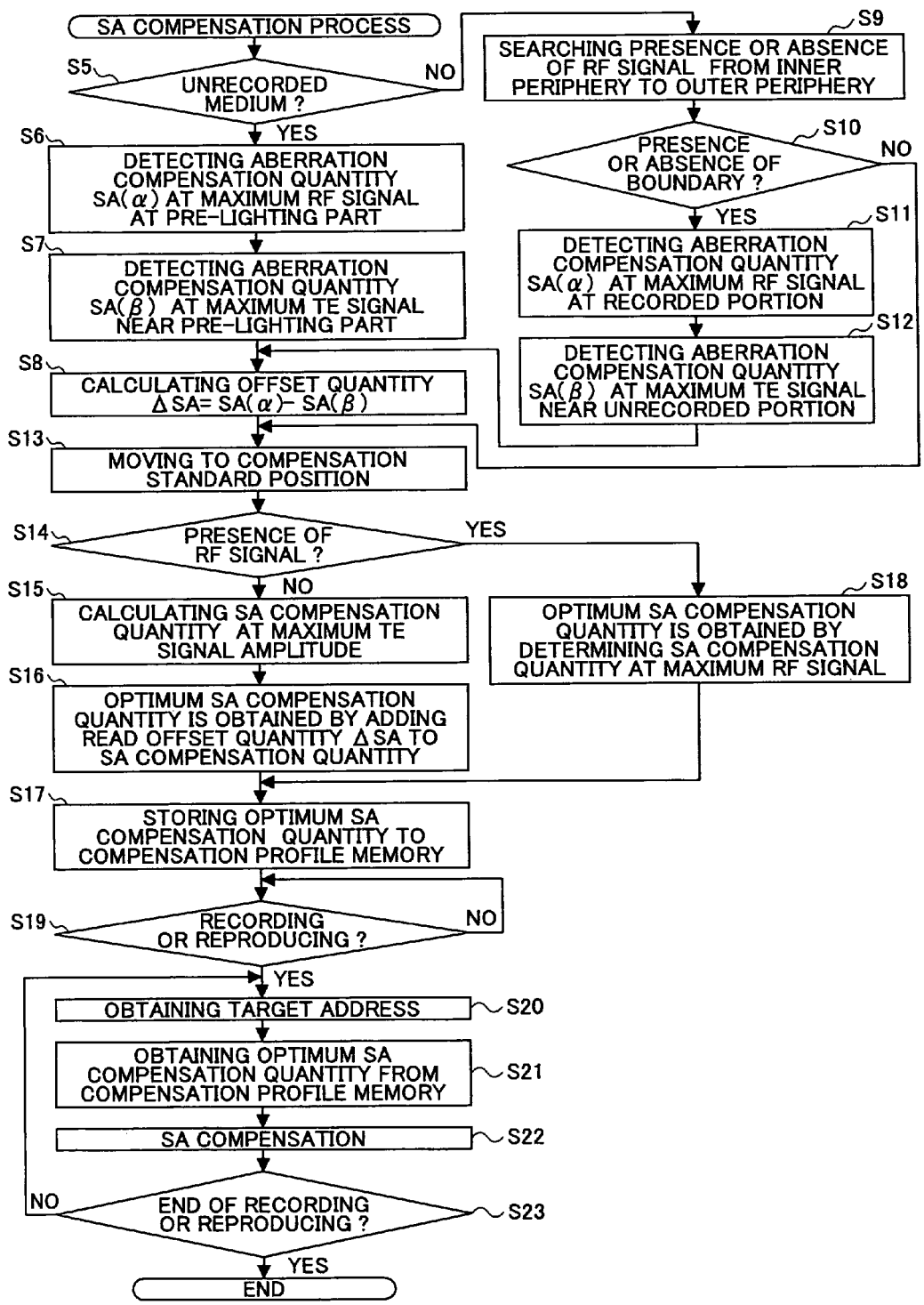
FIG. 6 is a flowchart showing compensation of spherical aberration being generated in an optical recording medium in example 1 of embodiment 1 of the present invention.

FIG. 5 is a flowchart showing compensation processes in recording or reproducing processes. As a medium is set, one of the first and second blue-ray optical recording media is detected (Steps S1 and S2). For a method for determining the type of a medium, 1. Determining based on an output from a provided thickness detection optical system composed of an LED (light-emitting diode) and a light-receiving element in the step of setting an optical recording medium, 2. Detecting a focus error signal and determining whether a TE signal is detected near a focus.

3. Determining based on the difference of the cartridge shapes of optical recording media with cartridge shapes different from each other, 4. Determining by reading information provided on a label of an optical recording medium using a bar code reader, on which label the kind of the medium is printed as a bar code, and 5. Determining based on a quantity by which an objective lens actuator can move to a focus position, etc., can be provided.

Then, when the first blue-ray optical recording medium is recognized (Yes in S2), a control signal is sent to the spherical aberration compensation driver 123, and when the second blue-ray optical recording medium is recognized (No in S2), a control signal is sent to the tilt compensation driver 124. Subsequently, processes for recording or reproducing are performed while a spherical aberration compensation operation described below is performed (Steps S3 and S4).

Processes for compensating for spherical aberration caused by a substrate thickness error of the first blue-ray optical recording medium are described as example 1 of embodiment 1, with reference to FIG. 4. For the spherical aberration compensation, the CPU 125 basically determines a spherical aberration compensation quantity at which the amplitude of an RF signal is the maximum and controls the spherical aberration (SA) compensation driver 123 based on the quantity so as to move the lens 104a.

Now, as a medium is set, the CPU 125 performs a measurement process for an offset quantity $\Delta SA$ (Steps S5 through S12).

Specifically, a quantity of spherical aberration on which the amplitude of an RF signal is the maximum and a quantity of spherical aberration on which the amplitude of a TE signal is the maximum are obtained and an offset quantity $\Delta SA$ is calculated as the difference between the quantities, at a position on the boundary of a recorded area on the medium on which area an RF signal can be obtained and an unrecorded area on which no RF signal can be obtained. Also, for an unrecorded medium, the detection can be made on a boundary portion of a pre-written portion in which recording has been made previously in a lead-in area.

Further, a process for measuring the offset quantity is described in detail. First, the CPU 125 determines whether a set medium is an unrecorded medium (Step S5). In the case of a recorded medium, administrative information, etc., has been already recorded in front of the pre-written portion, and on the other hand, in the case of an unrecorded medium, the fact of "unrecorded" can be utilized.

In a process of step S5, when the determination is an unrecorded medium (Yes in S5), the CPU 125 varies the quantity of spherical aberration compensation in the pre-written portion and detects a quantity of aberration compensation SA($\alpha$) at which the amplitude of an RF signal is the maximum (Step S6).

In an unrecorded portion near the pre-written portion, the quantity of spherical aberration compensation is varied so that a quantity of aberration compensation SA($\beta$) at which the amplitude of a TE signal is the maximum is detected (Step S7).

Then, the CPU 125 calculates an offset quantity $\Delta SA$ from the quantities of aberration compensation SA($\alpha$), SA($\beta$) and stores the quantities in an internal memory (Step S8).

On the other hand, when the medium is not determined to be an unrecorded medium in a process of step S5 (No in step S5), the CPU 125 searches for the presence of the boundary of an RF signal from an inner periphery to an outer periphery of the medium (Step S9). The search is performed by moving an optical pick-up from the inner periphery to the outer periphery of the medium on the condition that a tracking servo is operating and by monitoring the change of the amplitude of an RF signal obtained in the search process. Since the amplitude of the obtained RF signal becomes less at the boundary of the RF signal, such a position can be set as a boundary of an RF signal.

Then, the presence of a boundary of an RF signal is determined (Step S10), and when the boundary is found (Yes in S10), the quantity of spherical aberration compensation is varied at a recorded portion near the boundary so that the quantity of aberration compensation SA($\alpha$) at which the amplitude of the RF signal is the maximum is detected (Step S11).

Also, the quantity of aberration compensation SA($\beta$) is varied at an unrecorded portion near the boundary so that the quantity of aberration compensation SA($\beta$) at which the amplitude of the TE signal is the maximum is detected (Step S12).

Then, the CPU 125 calculates an offset quantity $\Delta SA$ from the quantities of aberration compensation SA($\alpha$), SA($\beta$) and stores the quantities in an internal memory (Step S8).

As described above, the offset quantity $\Delta SA$ can be obtained for both a recorded medium and an unrecorded medium due to the process for measuring the offset quantity.

Subsequently, the CPU 125 creates a compensation profile (Steps S13 through S17). First, the CPU 125 moves the optical pick-up to a predetermined standard position for compensation on the medium (Step S13). The standard position for compensation is for performing spherical aberration compensation and, for example, can be three areas such as an inner area, a middle area, and an outer area. First, the standard position for compensation is set to be the inner area.

The CPU 125 reads the standard position for compensation and determines whether an RF signal is obtained (Step S14). In the process of step S14, when no RF signal is obtained (No in S14), it is determined that the standard position for compensation is an unrecorded portion. Therefore, the CPU 125 determines the optimum quantity for SA compensation using the amplitude of a TE signal. That is, the quantity of spherical aberration is varied at the standard position for compensation and the amplitude of a TE signal is detected, so as to determine the quantity of spherical aberration compensation at which the amplitude of the TE signal is the maximum (Step S15).

Next, the CPU 125 adds the offset quantity $\Delta SA$ obtained by the previous process for measuring an offset quantity to the spherical aberration quantity obtained by the process of step S15. The spherical aberration quantity obtained by the addition corresponds to where the amplitude of an RF signal is the maximum and is the optimum SA compensation quantity (Step S16).

On the other hand, in the process of step S14, when an RF signal is obtained (Yes in S14), the quantity of spherical aberration compensation is varied at the standard position for compensation so as to determine a spherical aberration compensation quantity on which the amplitude of the RF signal is the maximum and which is the optimum SA compensation quantity (Step S18).

Then, the CPU 125 stores the optimum SA compensation quantity obtained by the process of step S16 or step S18 in a compensation profile memory (Step S17).

In the processes described above, as the compensation profile is created, the CPU 125 performs spherical aberration compensation and an operation of recording or reproducing.

Next, processes for spherical aberration compensation performed with recording or reproducing are described (Steps S19 through S23).

First, the CPU 125 determines whether an instruction of recording information to the medium or reproducing information from the medium is given (Step S19). Then, when the instruction of recording or reproducing is given (Yes in S19), the CPU 125 obtains an address as a target for recording or reproducing using the TE signal, etc., (Step S20) and the optimum SA compensation quantity corresponding to the address from a compensation profile memory (not shown in the figure) in the CPU 125.

Then, the CPU 125 controls the spherical aberration (SA) compensation driver 123 so as to perform spherical aberration compensation according to the obtained optimum SA compensation quantity (Step S22). Further, the CPU 125 determines whether an instruction for end of recording or reproducing is input by a user (Step S23), and the processes of steps S20 through S22 are repeated until the instruction for ending is input (No in S23). Then, as the instruction for ending is input, the processes are terminated (Yes in S23).

As described above, first, a spherical aberration compensation quantity on which the amplitude of a RF signal is the maximum and a spherical aberration compensation quantity on which the amplitude of a TE signal is the maximum are obtained from a boundary between a recorded portion and an unrecorded portion of a medium as a target for recording or reproducing, and an offset quantity ΔSA is calculated from the spherical aberration compensation quantities in embodiment 1 of the present invention. Next, the optimum SA compensation quantity is determined at a standard position for compensation of the medium based on the RF signal if recorded or based on the TE signal and the offset quantity ΔSA if unrecorded, and is stored as a compensation profile. Then, spherical aberration compensation is performed with reference to the compensation profile at the time of recording or reproducing for the medium.

Additionally, since the spherical aberration compensation is performed using a compensation profile created on every medium, the spherical aberration compensation can reliably be performed regardless of the kind of the medium, etc.

Also, since an information processing apparatus to perform recording or reproducing itself determines the optimum SA compensation quantity so as to create the compensation profile, even if there is a dispersion of the characteristic of an optical system such as an optical pick-up of the information processing apparatus, the optimum SA compensation quantity can be obtained on the premise of the characteristic.

Further, since the compensation profile is created prior to actual recording or reproducing, the influence of the variation of the characteristic caused by age-induced deterioration of an optical system of the apparatus or the variation of the characteristic caused by temperature change during recording or reproducing is small.

As example 2 of embodiment 1 of the present invention, processes for compensating for tilt (coma aberration) are described. Similar to aforementioned example 1, coma aberration caused by tilt of an optical recording medium can also be compensated for in example 2.

First, a coma aberration compensation quantity on which the amplitude of an RF signal is the maximum and a coma aberration compensation quantity on which the amplitude of a TE signal is the maximum are obtained from the boundary between a recorded portion and an unrecorded portion on a medium as a target for recording or reproducing, and an offset quantity ΔTilt is calculated from the coma aberration compensation quantities. Next, the optimum coma compensation quantity is determined at a standard position for compensation of the medium based on the RF signal if recorded or based on the TE signal and the offset quantity ΔTilt if unrecorded, and is stored as a compensation profile. Then, tilt compensation is performed with reference to the compensation profile for the medium at the time of recording or reproducing.

Additionally, although tilt is classified into two directions, that is, a rotation direction and a radial direction, the radical direction is the main problem direction and may be the only compensated-for direction. This is because an optical recording medium is not manufactured to be planar and has a degree of warpage such as bowl-like warpage in the radial direction.

Now, compensation of spherical aberration dependent on substrate thickness of an optical recording medium is described. First, the spherical aberration caused by a thickness error of the first blue-ray optical recording medium can be compensated for by changing the lens space between the lenses 104a and 104b in the aberration compensation optical system 104. That is, spherical aberration caused by a thickness error of the first blue-ray optical recording medium can be compensated for by moving either of the lenses of the aberration compensation optical system 104 along the direction of an optical axis thereof.

Figure 7A:
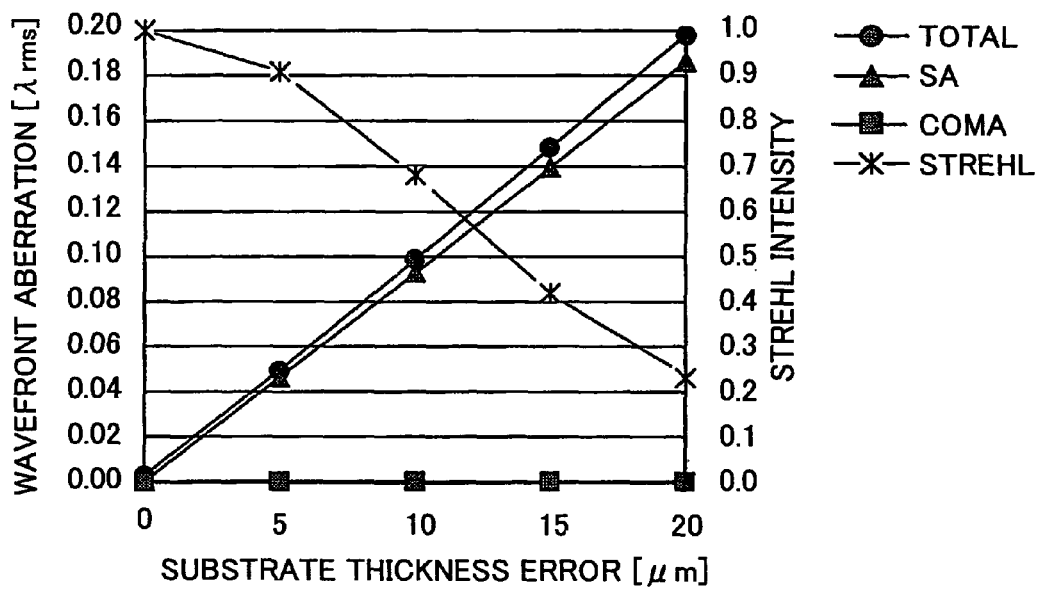
FIG. 7A is a characteristic diagram of wavefront aberration caused by a thickness error of an optical recording medium.
Figure 7B:
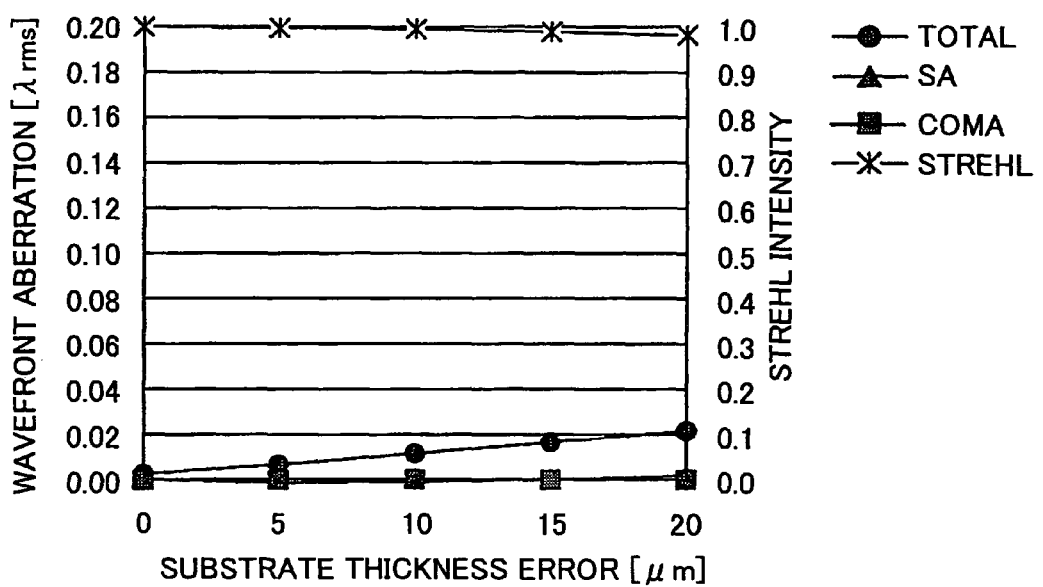
FIG. 7B is a characteristic diagram of wavefront aberration compensated for by an aberration compensation optical system.

Herein, the values of aberration in the case of no aberration compensation optical system 104 and the values of aberration in which compensation is applied by changing the space between the lenses 104a, 104b along the central optical axis when the thickness error of an optical recording medium is 0 μm through 20 μm relative to a design value are shown in FIGS. 7A and 7B.

From the graph shown in FIG. 7A, in the case of no aberration compensation optical system 104, a specified value of aberration of 0.035 λrms is obtained when the substrate thickness error is approximately 4 μm. However, since it is known that the thickness error of an optical recording medium depends on the accuracy of injection molding at the time of manufacturing the medium and a thickness error of approximately ±10 μm generally occurs, the error cannot be allowed without the aberration compensation optical system 104.

On the other hand, as shown in FIG. 7B, when the space between the lenses 104a, 104b is changed along the central optical axis for the compensation, a substrate thickness error of ±20 μm or more can be allowed and it is understood that the optical recording medium can be manufactured against the aforementioned manufacturing tolerance of ±10 μm.

Next, coma aberration caused by tilt of the second blue-ray optical recording medium can be compensated for by shifting the lens 104b of the aberration compensation optical system 104 along the radial direction of the optical recording medium.

Figure 8A:
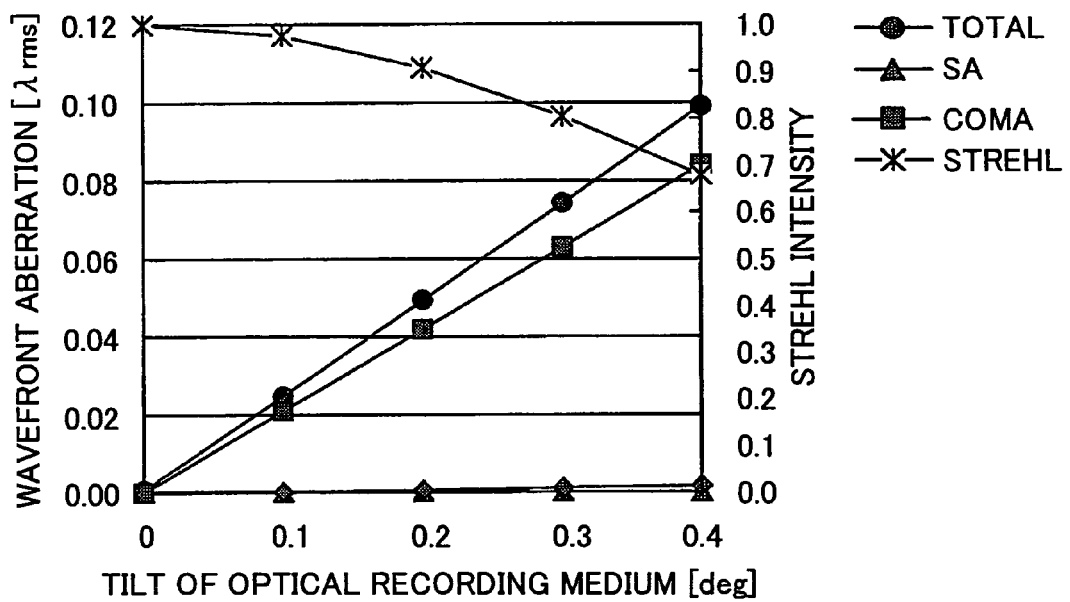
FIG. 8A is a characteristic diagram of wavefront aberration caused by tilt of an optical recording medium.
Figure 8B:
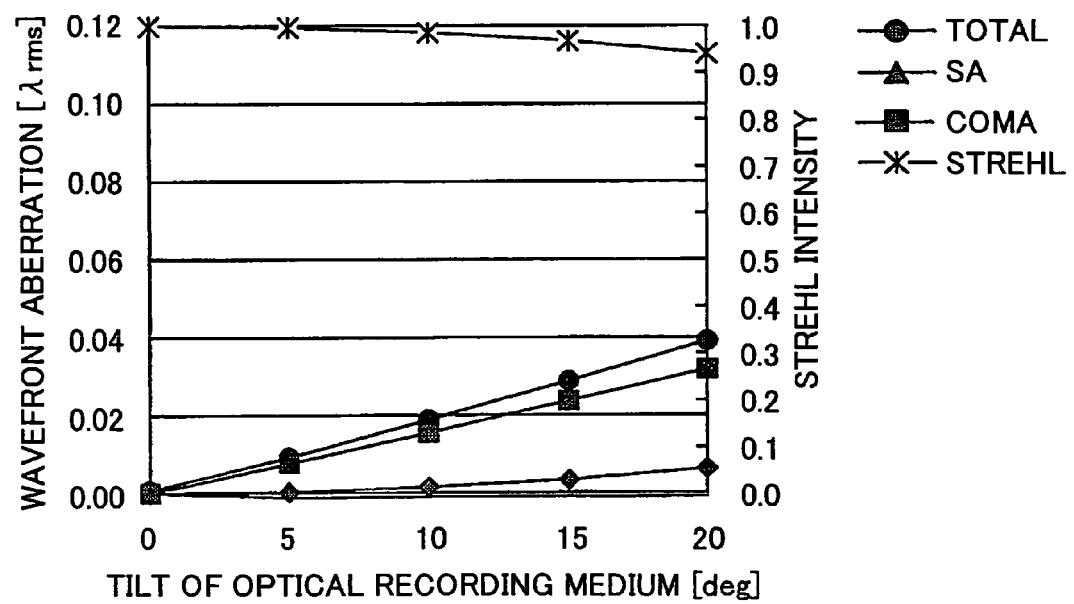
FIG. 8B is a characteristic diagram of wavefront aberration compensated for by an aberration compensation optical system.

Herein, when the tilt of the optical recording medium is 0 degrees through 0.4 degrees, the aberration values in the case of no aberration compensation optical system 104 and the aberration values in which the shift quantity of the lens 104b is changed for the compensation are shown in FIGS. 8A and 8B, respectively.

From the graph shown in FIG. 8A, in the case of no aberration compensation optical system 104, a specified value of aberration of 0.035 λrms is obtained when the tilt quantity of the optical recording medium is 0.15 degrees. However, although the tilt of the second blue-ray optical recording medium is held in the optical recording medium itself, it is known that a tilt quantity of approximately ±0.3 degrees arises as tilt caused by chucking the optical recording medium on a turn table (not shown in the figures), etc., is taken into consideration, and the tilt quantity cannot be allowed without tilt compensation.

On the other hand, as shown in FIG. 8B, when the shift quantity of the lens 104b is changed for the compensation, a tilt quantity of the optical recording medium of up to ±0.4 degrees can be allowed and it is understood that the optical recording medium can be manufactured.

Also, in embodiment 1 of the present invention, an aberration compensation diffraction element 107 and a liquid crystal aperture-limiting element 106 are arranged so that the compatibility of the second blue-ray optical recording medium having a substrate thickness different from that of the first blue-ray optical recording medium is provided by an objective lens optimized for the first blue-ray optical recording medium.

Figure 9A:
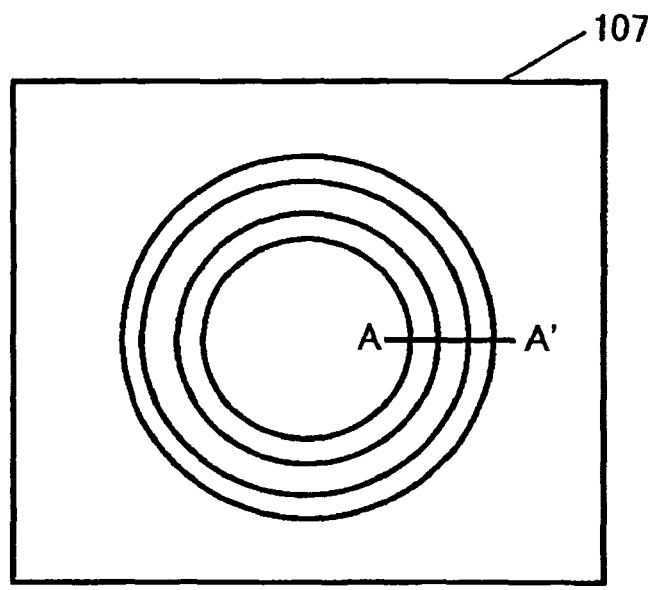
FIG. 9A is a front view of an aberration compensation diffraction element.
Figure 9B:
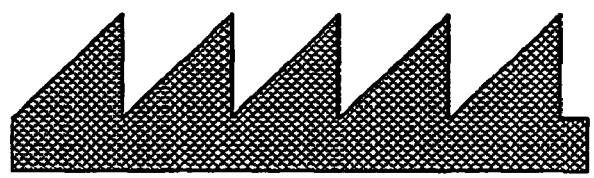
FIG. 9B is a cross-sectional view of an aberration compensation diffraction element with a saw-tooth shape.
Figure 9C:
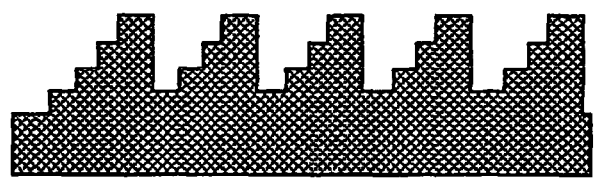
FIG. 9C is a cross-sectional view of an aberration compensation diffraction element with a step shape.

First, the aberration compensation diffraction element 107 is composed of plural annular zones centered on the optical axis thereof as shown in FIG. 9A. The aberration compensation diffraction element 107 is formed such that the cross section thereof has a sawtooth shape as shown in FIG. 9B or a step shape as shown in FIG. 9C. For example, the diffraction efficiency of a diffraction grating with a sawtooth-shaped cross section is higher than that of the others and useful. As a method for forming the shape of the cross section of a diffraction grating, a method for applying a photolithographic technique and a precision cutting method using a diamond bit, etc., are provided. Also, the plural diffraction optical elements can be replicated from a transparent material by a so-called 2P (photo-polymer) method such that a pattern with a desired shape is formed on a mold, resin is applied or injection molded on a base substrate, and the resin is pressed with the mold while irradiated ultra-violet rays are applied for curing the resin.

Figure 10A:
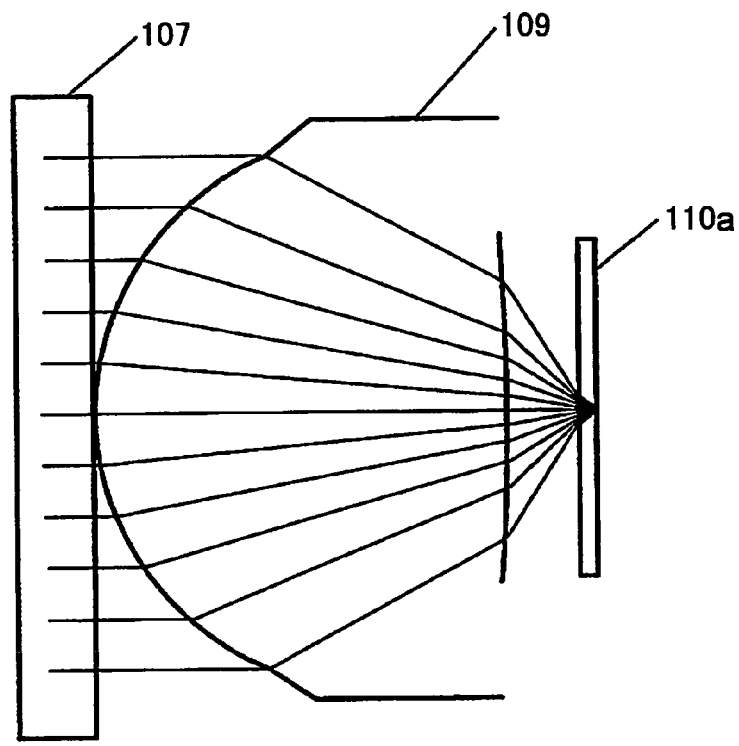
FIG. 10A is a diagram showing the focusing state of a condensed light beam onto the first blue-ray optical recording medium through an aberration compensation diffraction element and an objective lens.
Figure 10B:
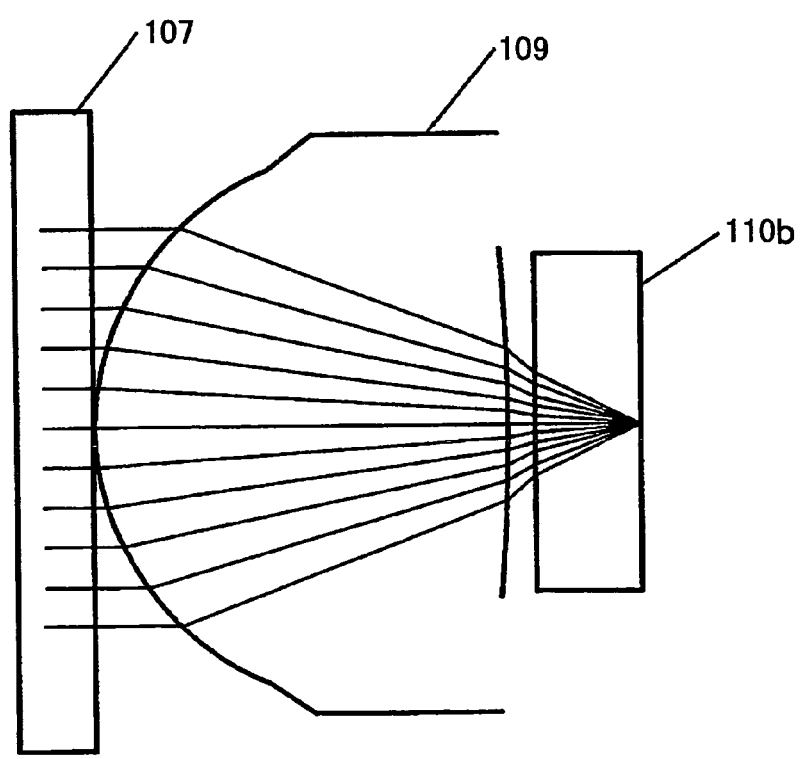
FIG. 10B is a diagram showing the focusing state of a condensed light beam onto the second blue-ray optical recording medium through an aberration compensation diffraction element and an objective lens.

The aberration compensation diffraction element 107 is formed such that the 0th order light is focused on the first blue-ray optical recording medium 110a through the objective lens 109 and the 1st order light is focused on the second order optical recording medium 110b through the objective lens 109 as shown in FIGS. 10A and 10B. Herein, since both the 0th order light and the 1st order light are not focused on an optical recording medium with another substrate thickness, these diffracted lights seldom influence recording or reproducing.

Additionally, the reason why the NA of the 0th order diffracted light among the diffracted order lights is selected to be 0.85 is that the objective lens 109 is designed such that a wavefront aberration is the minimum for the "first blue-ray optical recording medium with a used wavelength of 405 nm, an NA of 0.85, and a substrate thickness of 0.1 mm at the side of light irradiation" in an infinite system.

Also, for simplicity, the quarter-wave plate 108 between the aberration compensation diffraction optical element 107 and the objective lens 109 which plate is drawn in FIG. 3 is omitted in the FIGS. 10A and 10B.

Figure 11:
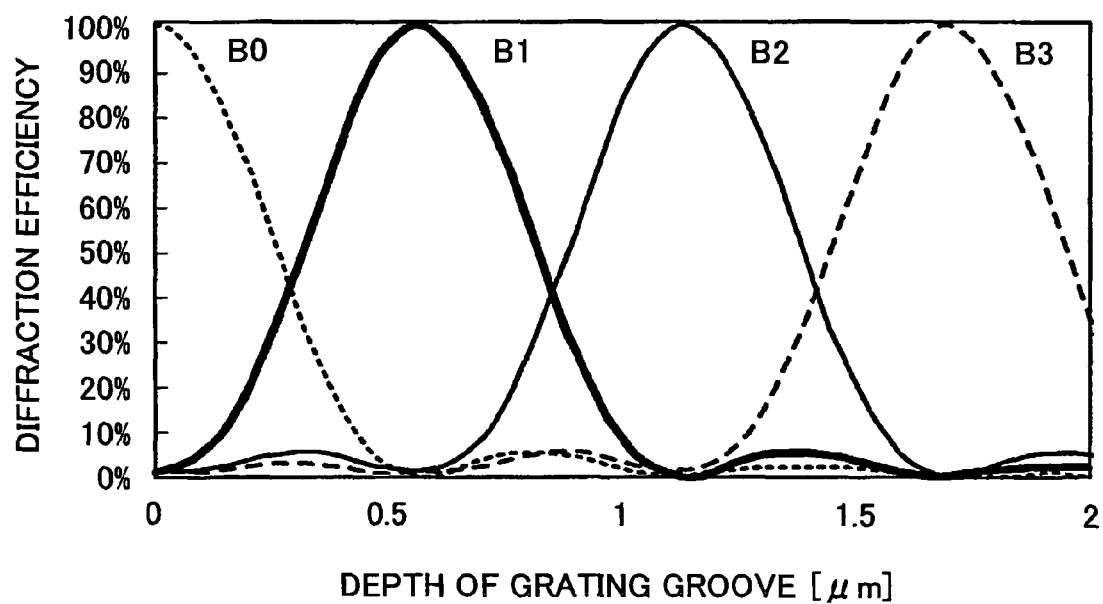
FIG. 11 is a diagram showing the variation of diffraction efficiency dependent on the depth of a grating groove.

Next, a specific example of calculated diffraction efficiency shown in FIG. 11 is the calculated variation of the diffraction efficiency, when the depth d of grating grooves of the diffraction optical element with a cross section of a blazed shape in FIG. 9 is varied from 0 μm to 2 μm and the element is manufactured using, for example, glass MlaC110 (nd=1.694, vd=53.2) produced by HOYA corporation as a base material. The diffraction efficiency ηm of a diffraction grating is represented by mathematical formula 5.

$$\eta m = \left( \frac{\sin\left(\pi\left(\frac{(n-1)d}{\lambda} - m\right)\right)}{\pi\left(\frac{(n-1)d}{\lambda} - m\right)} \right)^2$$

In the mathematical formula 5, d is the depth of grating grooves, m is a diffraction order, and n is the refractive index of the material.

In FIG. 11, the horizontal axis represents the groove depth d of the diffraction grating and the vertical axis represents the result of calculation for the variation of the diffraction efficiency of the diffraction grating. In FIG. 11, "B0", "B1", "B2", and "B3" represent the diffraction efficiencies for the 0th order diffracted light, the 1st order diffracted light, the 2nd order diffracted light, and the 3rd order diffracted light, respectively.

The diffraction efficiency can be selected by selecting the groove depth of the diffraction grating according to the irradiation power characteristic of the first blue-ray optical recording medium or the second blue-ray optical recording medium, since the diffraction efficiency can be adjusted by the groove depth of the diffraction grating as shown in FIG. 11. Generally, the smaller the spot diameter is, the larger the condensed power is. The diameter of a beam spot on an optical recording medium is directly proportional to the wavelength λ and is inversely proportional to NA, and the power of the spot is inversely proportional to the surface area of the spot. That is, when the case of NA 0.85 is compared to the case of NA 0.65, the power of light condensed on an optical recording medium with NA 0.85 is larger than the case of NA 0.65 at the rate of $(0.85/0.65)^2$. Therefore, when the first and second blue-ray optical recording media are used on the condition of the same materials and the same linear velocity, it is only necessary to make the efficiency ratio of 0th order light to 1st order light be 1:1.7, since the powers of condensed light necessary for respective media are equivalent. That is, it is only necessary to select approximately 0.32 μm as the depth of grating grooves.

Alternatively, in an optical information processing apparatus, if the reproducing efficiency of one of the first and second optical recording media is reduced, a sufficient power can irradiate the other optical recording medium and speeding up is easily attained.

Also, used numerical apertures of the first blue-ray optical recording medium and the second blue-ray optical recording medium are different from each other and are 0.85 and 0.65, respectively. As an aperture-limiting element, a liquid crystal element that functions as a selective annular light blocking filter as shown in FIG. 12A can be used. That is, the liquid crystal element is composed of a liquid crystal shutter with an annular pattern and transmits or blocks the peripheral portion of a beam incident on an objective lens. As shown in FIGS. 10(b) and (c), it is only necessary to use an element that transmits the beam through the entire surface thereof when no voltage is applied, that is, in the case of off-state, and then partially transmits the beam when a voltage is applied, that is, in the case of on-state.

Figure 13A:
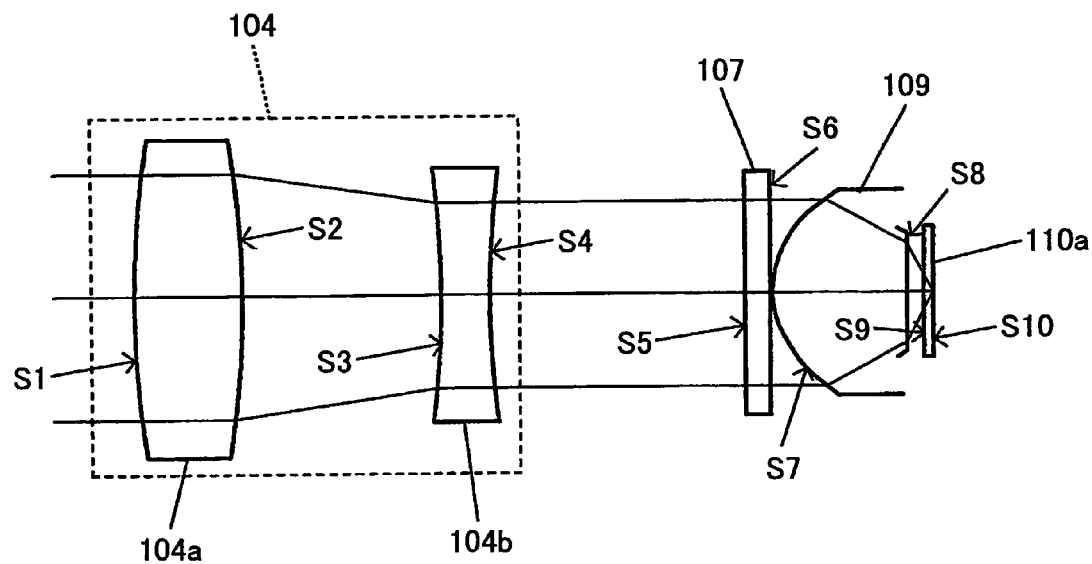
FIG. 13A is a diagram illustrating an optical system including an aberration compensation optical system, an aperture-limiting element, and an objective lens for the first blue-ray optical recording medium.
Figure 13B:
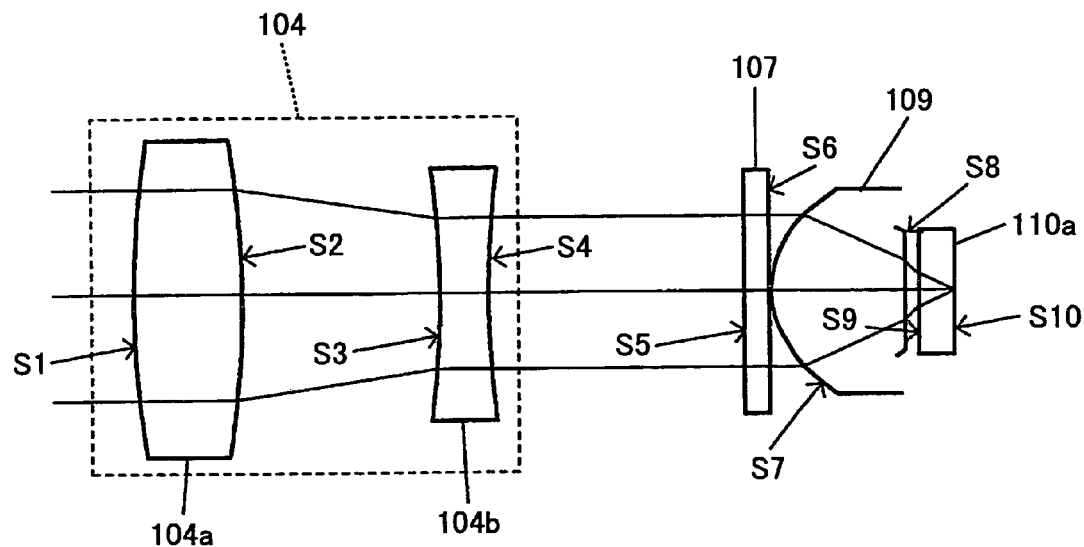
FIG. 13B is a diagram illustrating an optical system including an aberration compensation optical system, an aperture-limiting element, and an objective lens for the second blue-ray optical recording medium.

Next, the shapes of the objective lens 109, the aberration compensation diffraction element 107, and the aberration compensation optical system 104 shown in FIGS. 13A and 13B are described with specific examples of values for the shapes below.

Herein, the shape of an aspheric lens surface is represented by a well-known formula for an aspheric surface, mathematical formula 6

$$X = \frac{\frac{Y^2}{R}}{1 + \sqrt{1 - \frac{(1+K)Y}{R^2}}} + AY^4 + BY^6 + CY^8 + DY^{10} + EY^{12} + FY^{14} + \ldots$$

wherein X is a coordinate in the direction of an optical axis, Y is a coordinate in the direction orthogonal to the optical axis, R is a paraxial radius of curvature, K is a conic coefficient, and A, B, C, D, E, F, . . . are higher-order coefficients.

Also, a phase function φ(r) is represented by mathematical formula 7

$$\phi(r) = \frac{2m\pi}{\lambda}(C1 + C2 \cdot r^2 + C3 \cdot r^4 + C4 \cdot r^6 + C5 \cdot r^8 + \ldots)$$

wherein m is a diffraction order, λ is a wavelength, r is a radius from an optical axis, and C1, C2, C3, C4, C5, . . . are coefficients.

The structure of an optical system in embodiment 1 of the present invention is described with FIGS. 13A, 13B, and 14. Herein, for the objective lens 109, the used wavelength is 405 nm, NA is 0.85, f is 1.765 mm, nd is 1.694, vd is 53.2, and the symbols in FIG. 14 are as follows. "OBJ" means an object point (a semiconductor laser as a light source), and a beam incident on the aberration compensation optical system is in accordance with an "infinite system", that is, "INFINITY" as a radius of curvature RDY, and thickness THI, means that a light source lies at an infinite point. Additionally, the unit of measure of a quantity with a dimension of length is "mm", unless a particular specification is made. "S1" thorough "S4" represent respective lens surfaces in the aberration compensation optical system 104, and "S1" and "S2" mean surfaces of the lens 104a of the aberration compensation optical system at the side of a light source and at the side of the objective lens 109, respectively.

Also, the thickness of "S1", 2.00 mm, means the thickness of the lens 104a. The thickness of "S2", 3.55 mm, represents the distance between the respective lenses of the aberration compensation optical system. The distance is changed from the center position, 3.55 mm, at the time of spherical aberration compensation. "S5" and "S6" mean surfaces of the aberration compensation diffraction element 107 at the side of a light source and at the side of the optical recording medium, respectively. "S7" and "S8" mean surfaces of the objective lens 109 for the optical pick-up at the side of a light source and at the side of the optical recording medium, respectively.

The thickness of the objective lens 109 in embodiment 1 of the present invention is 2.38 mm and the thickness, 0.43 mm, described at the right side of the radius of curvature in the row of "S8" means a "working distance: WD". "S9" is a surface of an irradiation-sided substrate of the optical recording medium 110 at the side of a light source and "S6" is a surface identical to a recording surface of the medium. The separation between these surfaces "S5" and "S6", that is, the thickness of the substrate is 0.1 mm for the first blue-ray optical recording medium 110a or 0.6 mm for the second blue-ray optical recording medium 110b, and nd is 1.516310 and vd is 64.1. "WL: wavelength" represents a used wavelength (405 nm).

The axial wavefront aberration of an optical system obtained by combining the objective lens, the diffraction optical element and the aberration compensation optical system is 0.027 λrms for a system for recording on or reproducing from the first blue-ray optical recording medium (0th order light) and 0.0007 λrms for a system for recording on or reproducing from the second blue-ray optical recording medium (1st order light) and is controlled to Marechal's limit, 0.07λ, or less. Additionally, the aberration compensation diffraction element 107 may be integrated with the objective lens 109.

Figure 15A:
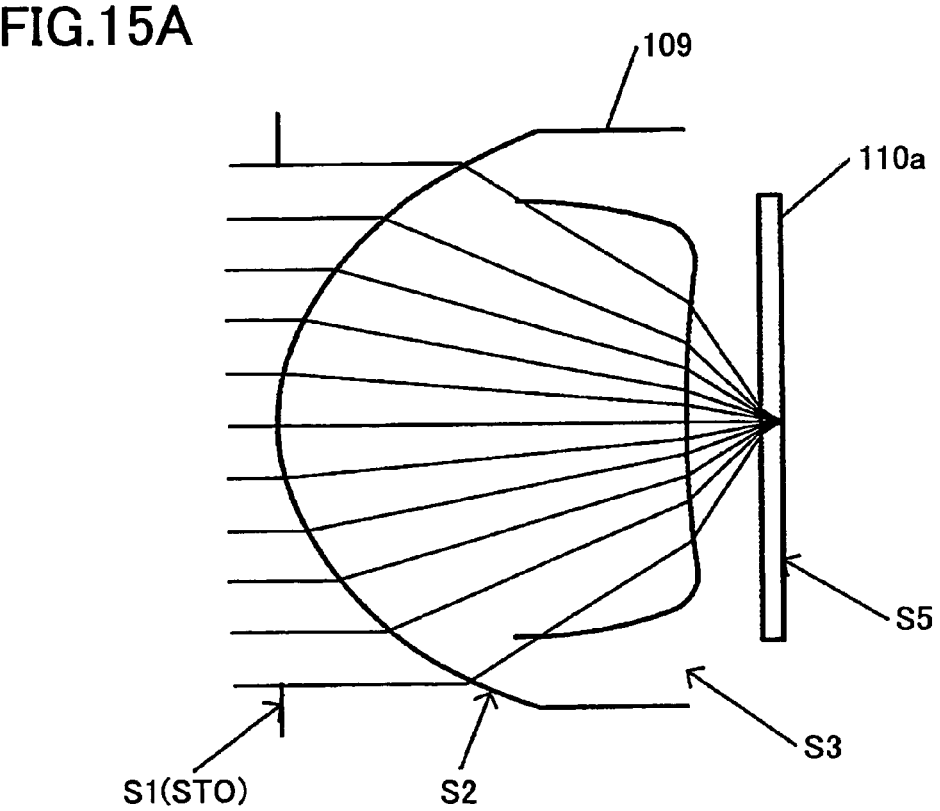
FIG. 15A is a diagram showing the focusing state on the first blue-ray optical recording medium when a diffraction grating is formed on an objective lens.
Figure 15B:
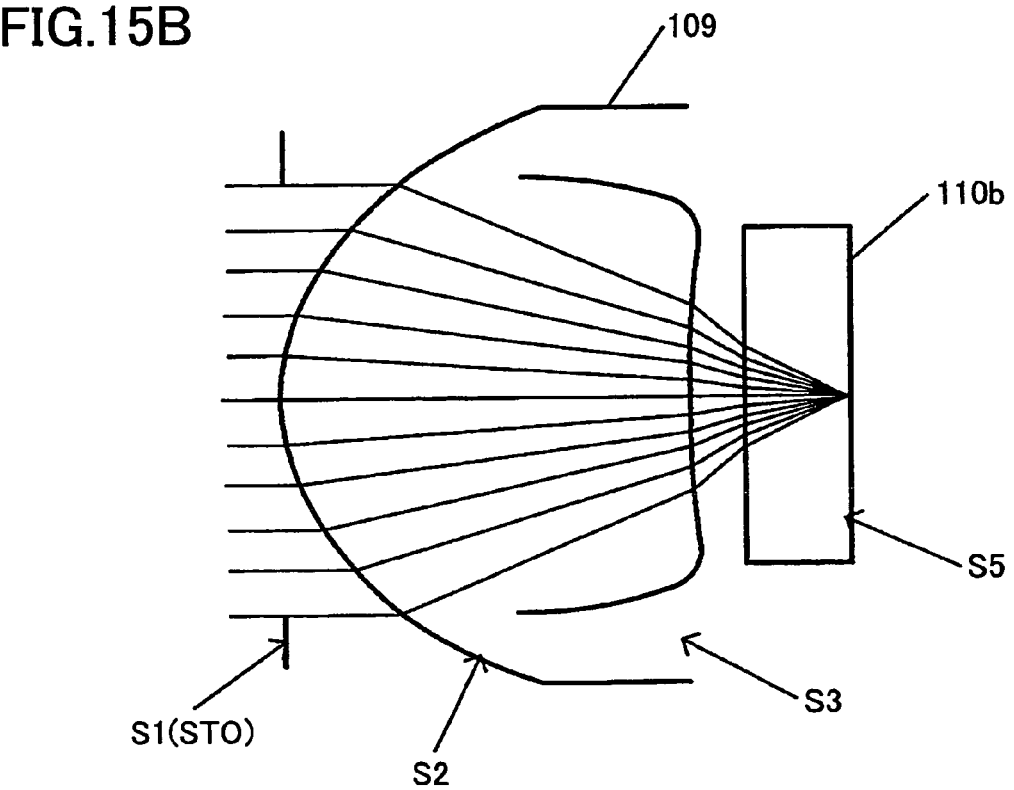
FIG. 15B is a diagram showing the focusing state on the second blue-ray optical recording medium when a diffraction grating is formed on an objective lens.

Also, a diffraction grating is formed on an entrance surface of the aspheric objective lens 109 at the side of a light source and exit surfaces of the diffraction grating and the objective lens 109 are in the form of aspheric surfaces, as shown in FIGS. 15A and 15B. Therefore, the first surface (S2) and the second surface (S2) are a diffraction grating and an entrance surface of an integrated condenser lens. The data of the respective aspheric lenses manufactured according to an automatic design are shown in FIG. 16.

Thus, the axial wavefront aberration of a system obtained by combining the objective lens and the diffraction element is 0.0049 λrms for the first blue-ray optical recording medium and 0.0005 λrms for the second blue-ray optical recording medium and is controlled to Marechal's limit, 0.07λ, or less.

Additionally, as a method of moving the aberration compensation optical system 104, although there has been provided a description for the case of moving the lens 104a and the lens 104b in the direction of the optical axis and the radial direction of the optical recording medium on a plane perpendicular to the optical axis, respectively, only one of the lenses 104a, 104b may be moved. In this case, the movable lens may be mounted on an actuator that moves biaxially in the direction of the optical axis and the radial direction of the optical recording medium in a plane perpendicular to the optical axis.

Also, although aberration compensation is performed using the lens with a positive power at the side of the light source and the lens with a negative power at the side of the optical recording medium in the aberration compensation optical system 104 in the aforementioned embodiment 1, the inverse structure of the optical system is allowed. Specifically, a structure such that the pick-up can be miniaturized as a whole may be selected.

Further, the aberration compensation optical system 104 may have both roles of spherical aberration compensation and as a collimator lens. In this case, the number of components can be reduced and the labor and cost for manufacturing an optical pick-up can be reduced.

Also, although a single lens is used as the objective lens 109 in aforementioned embodiment 1, a cemented lens may be used. Alternatively, a lens system composed of three or more lens groups may be used.

Then, although an optical system with a wavelength for light source of 405 nm is specifically provided in the aforementioned embodiment 1, the used wavelength is not limited to this wavelength and the effect is not changed for other wavelengths.

Additionally, since a manufacturing error other than the error in substrate thickness of the optical recording medium may also be included in an actual optical system, the optimum condition of the aberration compensation optical system may be stored in a step of mounting the optical pick-up to provide the optimum condition while the amplitude of the RF signal or the TE signal is monitored.

Next, embodiment 2 of the present invention is described. The difference from embodiment 1 is a configuration such that the aberration compensation optical system 104 also compensates for spherical aberration generated at the time of exchanging the two recording media. That is, the aberration compensation diffraction element 107 in FIG. 3 can be omitted.

Figure 17:
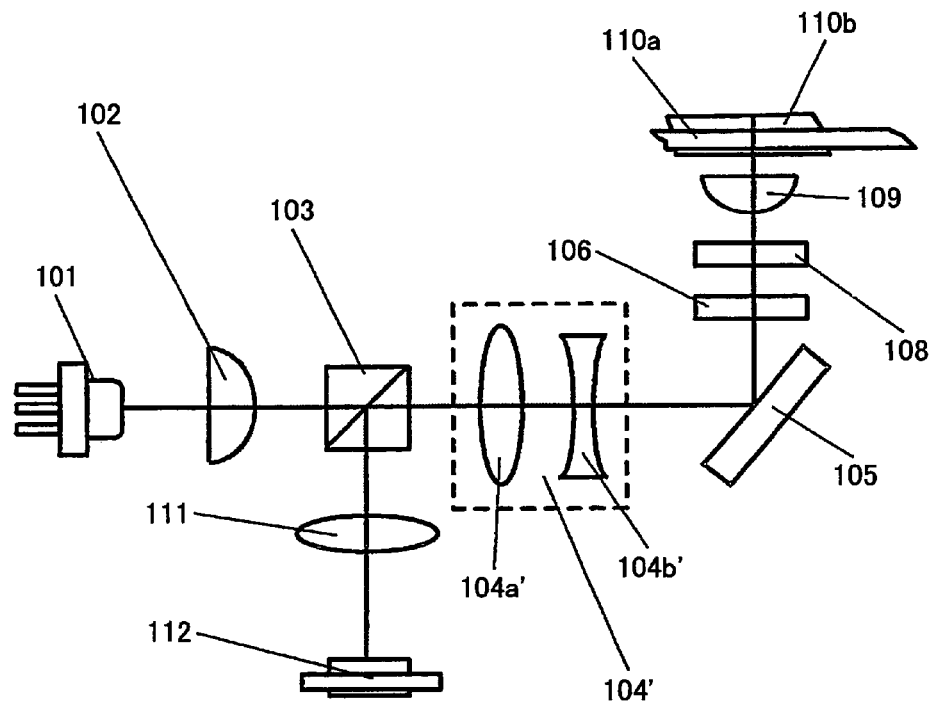
FIG. 17 is a schematic diagram showing the structure of an optical pick-up in embodiment 2 of the present invention.

FIG. 17 is a schematic diagram showing the structure of an optical pick-up in embodiment 2 of the present invention. As shown in FIG. 17, the principal part of the optical pick-up is composed of a semiconductor laser 101 for a wavelength of 405 nm, a collimator lens 102, a polarizing beam splitter 103, an aberration compensation optical system 104', a deflection prism 105, a liquid crystal aperture-limiting element 106, a quarter-wave plate 108, an objective lens 109, a detection lens 111, and a light-receiving element 112.

First, the case of recording or reproducing for the "first blue-ray optical recording medium with a used wavelength of 405 nm, an NA of 0.85, and a substrate thickness of 0.1 mm at the side of light irradiation" is described. Divergent light with a wavelength of 405 nm and linear polarization emitted from the semiconductor laser 101 is approximately collimated through the collimator lens 102, and converted to a predetermined converging beam by the polarizing beam splitter 103 and the aberration compensation optical system 104'. Then, the optical path of the light is deflected by 90 degrees by the deflection prism 105, and the light is insensitively transmitted through the liquid crystal aperture-limiting element 106, transmitted through the quarter-wave plate 108 to be circularly polarized light, enters the objective lens 109, and is focused into a micro-spot on the first blue-ray optical recording medium 110a. The recording, reproducing, or erasing of information is performed using the spot. The light reflected from the first blue-ray optical recording medium 110a becomes circularly polarized light with rotation direction opposing that in the forward route, is approximately collimated again, passes though the quarter-wave plate 108 to be light with linear polarization orthogonal to that in the forward route, is reflected by the polarizing beam splitter 103, becomes converging light through the detection lens 111, and is led to the light-receiving element 112. An information signal and a servo signal are generated from the light-receiving element 112.

Next, the case of recording or reproducing for the "second blue-ray optical recording medium with a used wavelength of 405 nm, an NA of 0.65, and a substrate thickness of 0.6 mm at the side of light irradiation" is described. Divergent light with a wavelength of 405 nm and a linear polarization emitted from the semiconductor laser 101 is approximately collimated through the collimator lens 102, and transmitted through the polarizing beam splitter 103 and the aberration compensation optical system 104' as an infinite system. Then, the optical path of the light is deflected by 90 degrees by the deflection prism 105 and the NA of the light is limited to 0.65 by the liquid crystal aperture-limiting element 106. Then, the light enters the objective lens 109, and is focused into a micro-spot on the second blue-ray optical recording medium 110b. The recording, reproducing, or erasing of information is performed using the spot. The light reflected from the second blue-ray optical recording medium 110b becomes circularly polarized light with rotation direction opposing that in the forward route, is approximately collimated again, passes though the quarter-wave plate 108 to be light with linear polarization orthogonal to that in the forward route, is reflected by the polarizing beam splitter 103, becomes converging light through the detection lens 111, and is led to the light-receiving element 112. An information signal and a servo signal are generated from the light-receiving element 112.

Figure 18:
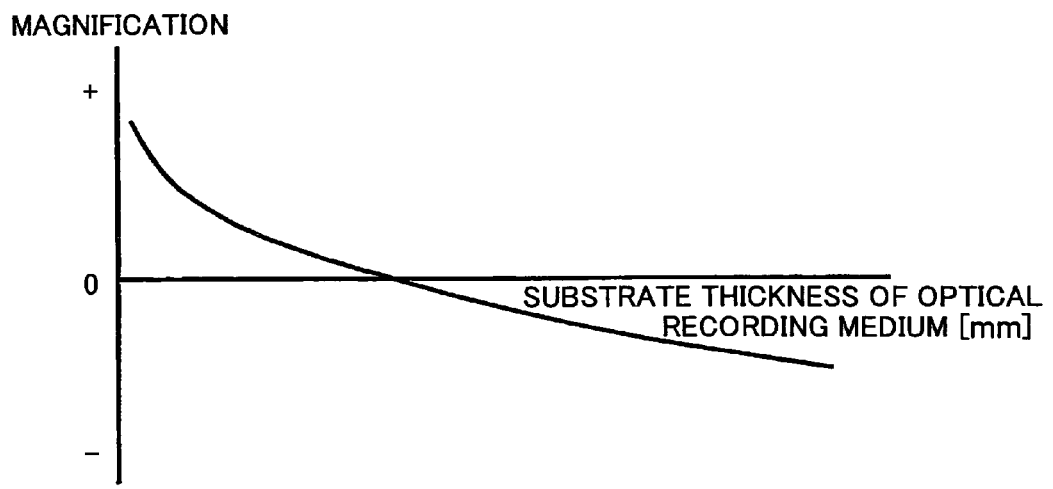
FIG. 18 is a graph showing the relationship between substrate thickness of an objective lens and magnification dependent on the divergence of light rays.

FIG. 18 is a graph showing the relationship between the substrate thickness of a general objective lens and the divergence of light rays. The horizontal axis represents the thickness of a substrate and the vertical axis represents the magnification of the objective lens in a condition as used, which is a function of the divergence of light rays incident on the objective lens. Since light rays emanating from the objective lens to the side of the substrate are always converging light rays, the sign for the incidence of converging light on the objective lens is "+" and the sign for the incidence of divergent light is "−". Also, when the magnification is "0", collimated light is incident on the objective lens. The curve in FIG. 18 is obtained by connecting magnifications such that wavefront aberration is minimum for each substrate thickness. For example, it is generally known that when the substrate thickness is X, the incidence of collimated light is the best, and "−", that is, when divergent light is incident on the objective lens, the larger the substrate thickness is, the smaller the aberration becomes. On the other hand, "+", that is, when convergent light is incident on the objective lens, the smaller the substrate thickness is, the smaller the aberration becomes.

Figure 19A:
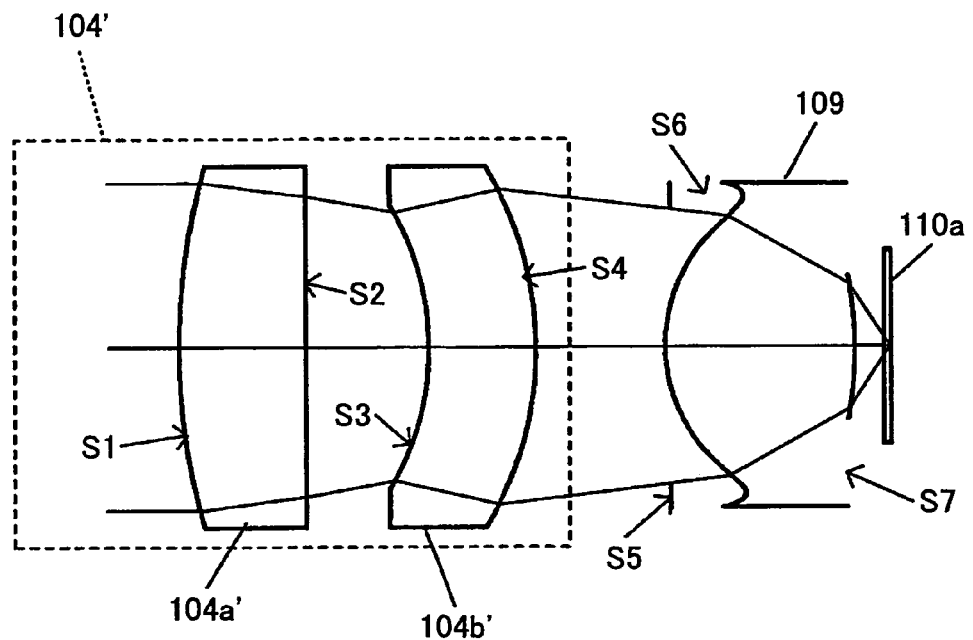
FIG. 19A is a diagram illustrating an optical system including an aberration compensation diffraction element and an objective lens for the first optical recording medium in embodiment 2 of the present invention.
Figure 19B:
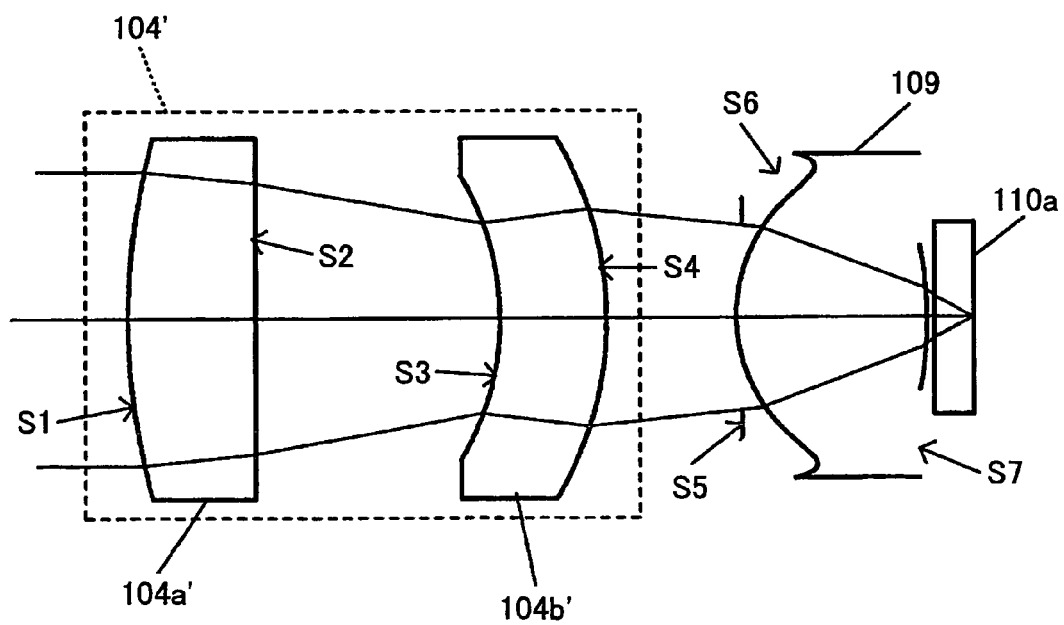
FIG. 19B is a diagram illustrating an optical system including an aberration compensation diffraction element and an objective lens for the second optical recording medium in embodiment 2 of the present invention.

As shown in FIGS. 19A and 19B, a shape of the objective lens 109 can be obtained such that aberration thereof is the best for the incidence of converging light on the first blue-ray optical recording medium 110a and the incidence of collimated light on the second blue-ray optical recording medium 110b. For the first blue-ray optical recording medium 110a, under-spherical aberration caused by reduction of the substrate thickness is canceled by over-spherical aberration caused by the converging light.

The aberration compensation optical system 104' is a device for compensating for spherical aberration caused by an error in the substrate thickness of the first blue-ray optical recording medium 110a and coma aberration caused by tilt of the second blue-ray optical recording medium 110b similar to embodiment 1 and the compensation of them is also similar to embodiment 1.

Whereas the light beam is emitted as collimated light from the aberration compensation optical system 104 in the center point for both the first and second blue-ray optical recording media 110a, 110b in the aforementioned embodiment 1, the light beam from the aberration compensation optical system 104' forms a converging system for the first blue-ray optical recording medium 110a and an infinite system for the second blue-ray optical recording medium 110b in embodiment 2 of the present invention.

That is, the structure of the converging system or the infinite system is selected depending on the determination of the type of the optical recording medium. When the determination is the first blue-ray optical recording medium 110a, the separation between the lenses 104a', 104b' is adjusted along the optical axis thereof so that a converging system is made and then the compensation of spherical aberration caused by an error in the substrate thickness starts. Also, when the determination is the second blue-ray optical recording medium 110b, the separation between the lenses 104a', 104b' is adjusted along the optical axis thereof so that an infinite system is made and then the compensation of coma aberration caused by tilt of the optical recording medium starts.

Also, a specific numerical example of the objective lens 109 and the aberration compensation optical system 104' which have the structure shown in FIGS. 19A and 19B is shown in FIG. 20.

Figure 21:
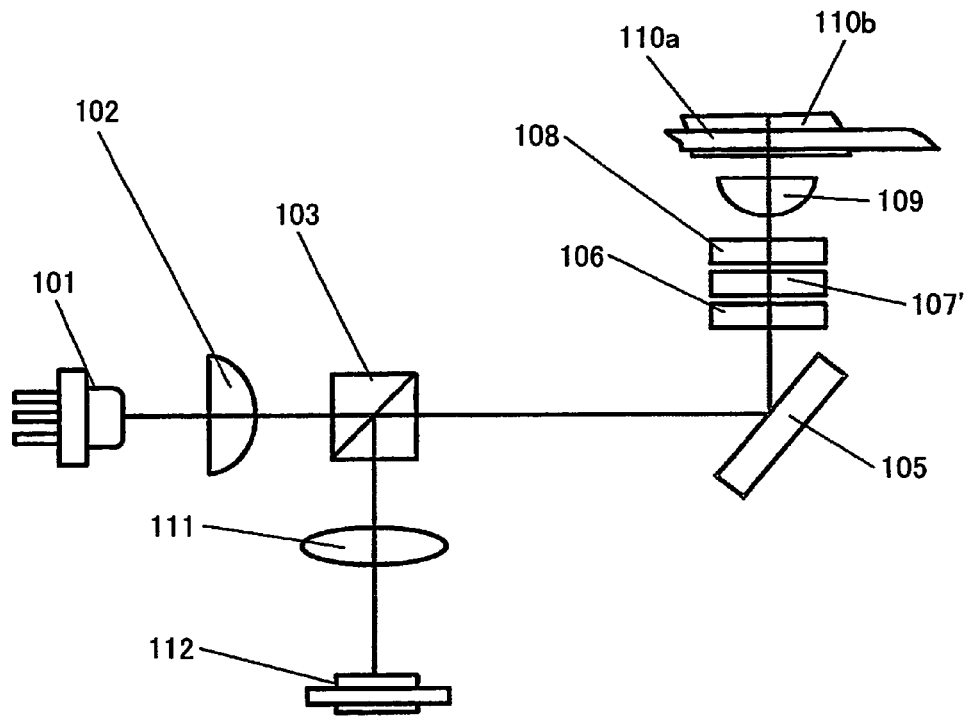
FIG. 21 is a schematic diagram showing the structure of an optical pick-up in embodiment 3 of the present invention.

FIG. 21 is a schematic diagram showing the structure of an optical pick-up in embodiment 3 of the present invention. With respect to embodiment 3, the difference from the aforementioned embodiments 1 and 2 is to the use of a liquid crystal element as the aberration compensation optical system. As shown in FIG. 21, the principal part of the optical pick-up is composed of a semiconductor laser 101 for a wavelength of 405 nm, a collimator lens 102, a polarizing beam splitter 103, a deflection prism 105, a liquid crystal aperture-limiting element 106, a liquid crystal aberration compensation element 107', a quarter-wave plate 108, an objective lens 109, a detection lens 111, and a light-receiving element 112. Herein, the objective lens 109 is designed such that the wavefront aberration is the minimum for an infinite system for the "first blue-ray optical recording medium with a used wavelength of 405 nm, an NA of 0.85, and a substrate thickness of 0.1 mm at the side of light irradiation", similar to embodiment 1.

First, the case of recording or reproducing for the "first blue-ray optical recording medium with a used wavelength of 405 nm, an NA of 0.85, and a substrate thickness of 0.1 mm at the side of light irradiation" is described. Divergent light with a wavelength of 405 nm and linear polarization emitted from the semiconductor laser 101 is approximately collimated through the collimator lens 102 and transmitted through the polarizing beam splitter 103. Then, the optical path of the light is deflected by 90 degrees by the deflection prism 105, and the light is insensitively transmitted through the liquid crystal aperture-limiting element 106 and the liquid crystal aberration compensation element 107', transmitted through the quarter-wave plate 108 to be circularly polarized light, enters the objective lens 109, and is focused into a micro-spot on the first blue-ray optical recording medium 110a. The recording, reproducing, or erasing of information is performed using the spot. The light reflected from the first blue-ray optical recording medium 110a becomes circularly polarized light with rotation direction opposing that in the forward route, is approximately collimated again, passes though the quarter-wave plate 108 to be light with linear polarization orthogonal to that in the forward route, is reflected by the polarizing beam splitter 103, becomes converging light through the detection lens 111, and is led to the light-receiving element 112. An information signal and a servo signal are generated from the light-receiving element 112.

Next, the case of recording or reproducing for the "second blue-ray optical recording medium with a used wavelength of 405 nm, an NA of 0.65, and a substrate thickness of 0.6 mm at the side of light irradiation" is described. Divergent light with a wavelength of 405 nm and linear polarization emitted from the semiconductor laser 101 is approximately collimated through the collimator lens 102, and transmitted through the polarizing beam splitter 103. Then, the optical path of the light is deflected by 90 degrees by the deflection prism 105 and the NA of the light is limited to 0.65 by the liquid crystal aperture-limiting element 106. Then, a predetermined spherical aberration is added to the light through the liquid crystal aberration compensation element 107' and the light enters the objective lens 109, and is focused into a micro-spot on the second blue-ray optical recording medium 110b. The recording, reproducing, or erasing of information is performed using the spot. The light reflected from the second blue-ray optical recording medium 110b becomes circularly polarized light with rotation direction opposing that in the forward route, is approximately collimated again, passes though the quarter-wave plate 108 to be light with linear polarization orthogonal to that in the forward route, is reflected by the polarizing beam splitter 103, becomes converging light through the detection lens 111, and is led to the light-receiving element 112. An information signal and a servo signal are generated from the light-receiving element 112.

Figure 22:
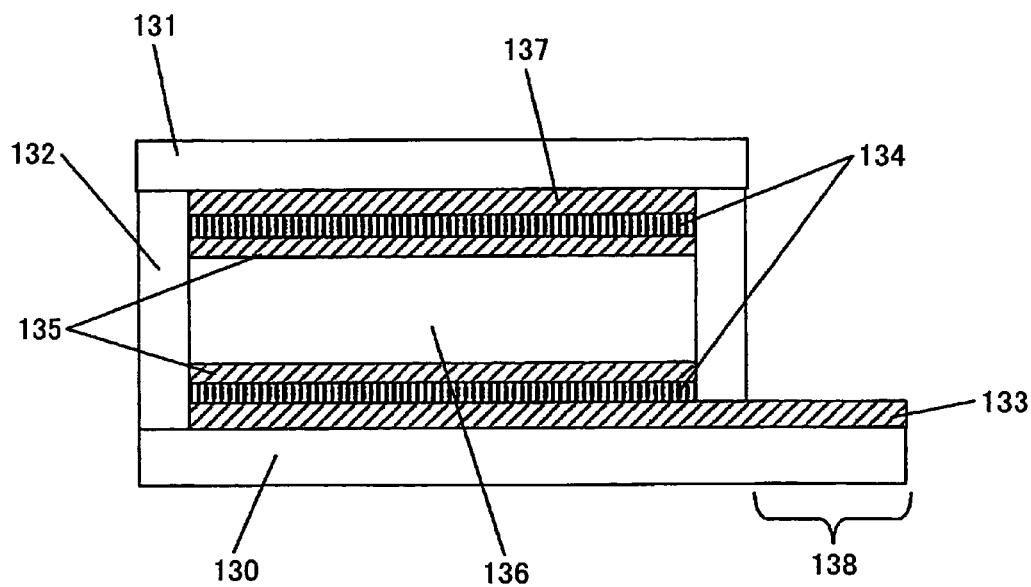
FIG. 22 is diagram showing a cross-sectional view of a liquid crystal aberration compensation element in embodiment 3 of the present invention.
Figure 23:
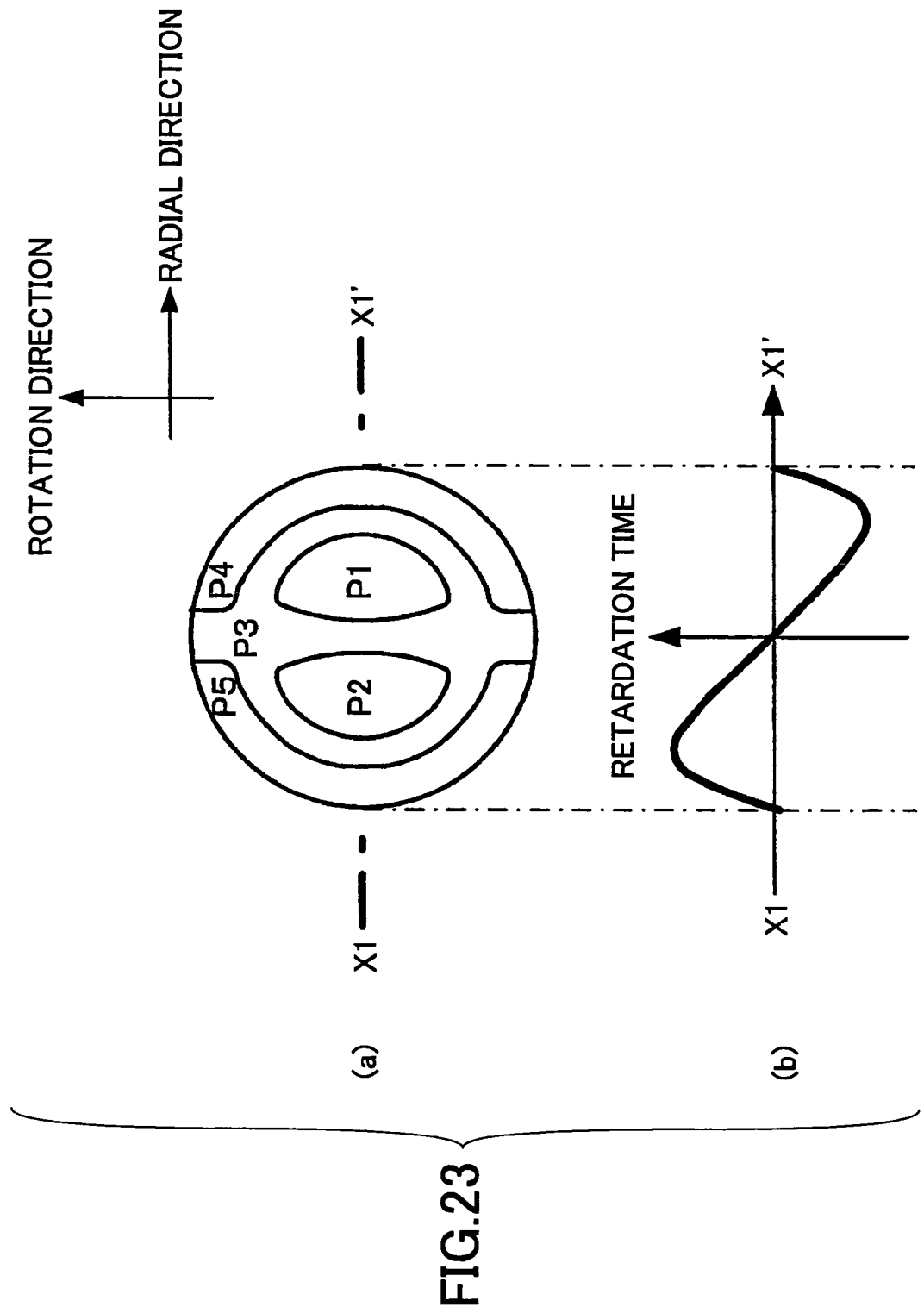
FIG. 23(a) is a diagram showing an electrode pattern for compensating for coma aberration of a liquid crystal aberration compensation element and FIG. 23(b) is a diagram showing a retardation time distribution for compensating for coma aberration of a liquid crystal aberration compensation element.
Figure 24:
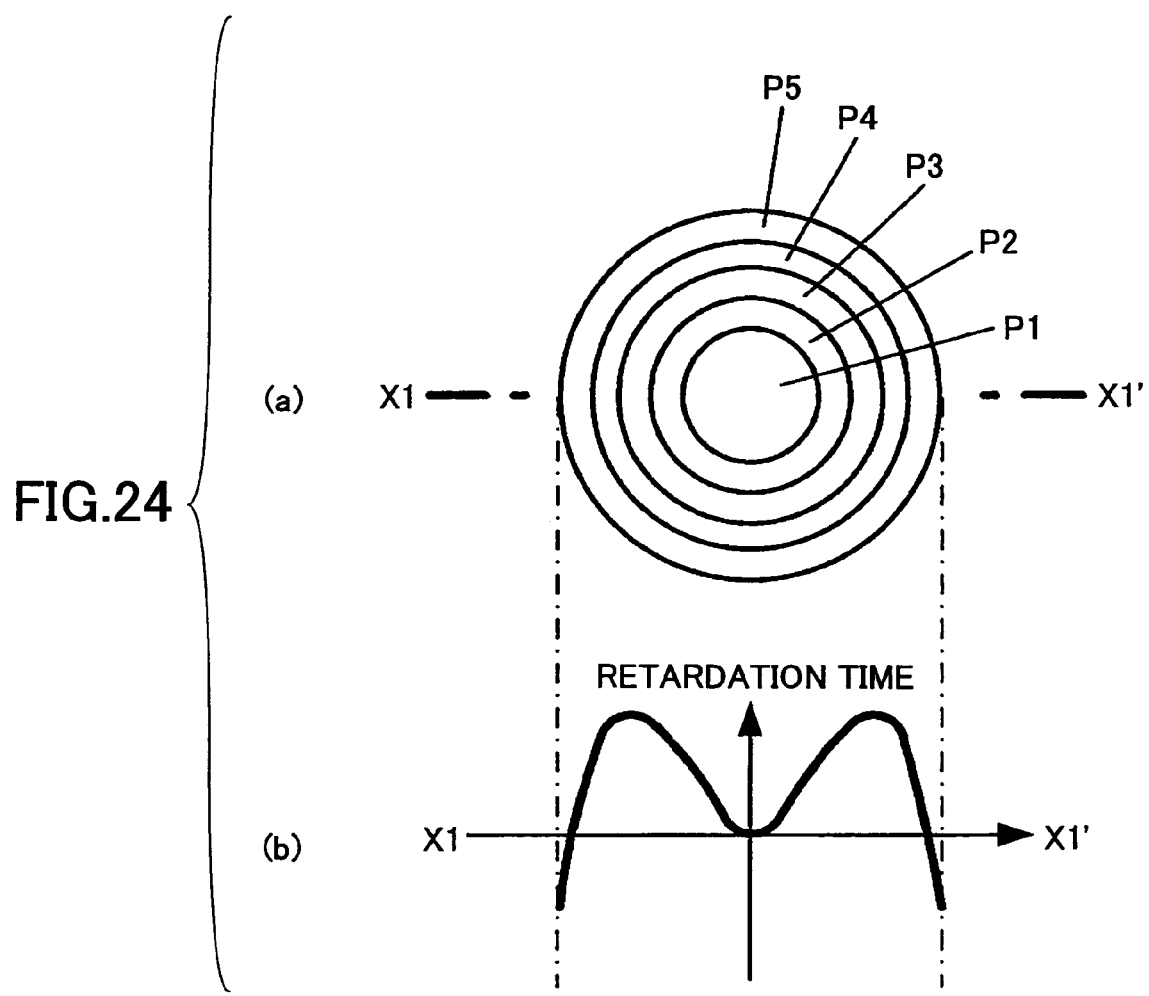
FIG. 24(a) is a diagram showing an electrode pattern for compensating for spherical aberration of a liquid crystal aberration compensation element and FIG. 24(b) is a diagram showing a retardation time distribution for compensating for spherical aberration of a liquid crystal aberration compensation element.

Next, the structure and operation principle of the liquid crystal aberration compensation element in embodiment 3 of the present invention are described using FIG. 22 showing the cross-sectional view of the liquid crystal aberration compensation element and FIGS. 23 and 24 showing examples of an electrode pattern thereof.

As shown in FIG. 22, glass substrates 130, 131 adhere to an electrically conductive spacer 132 so as to form a liquid crystal cell. An electrode 133, an insulating film 134 and an orientation film 135 are formed on the inner surface of the glass substrate 130 in order from the inner surface and an electrode 137, an insulating film 134, and an orientation film 135 are formed on the inner surface of the glass substrate 131 in order from the inner surface. Patterning for interconnection is made such that the electrode 133 can be connected to a control circuit through an interconnection line on an electrode leader portion 138.

Also, the electrode 137 is electrically connected to the electrode 133 formed on the glass substrate 130 through the electrically conductive spacer 132. Therefore, the electrode 137 can be connected to a phase correction control circuit through an interconnection line on the electrode leader portion 138. Liquid crystal 136 is supplied so as to fill the liquid crystal cell.

Next, the liquid crystal aberration compensation element 107' in embodiment 3 of the present invention is configured such that one of the electrodes formed on the substrate which electrodes sandwich a liquid crystal layer is patterned for compensation for spherical aberration caused by an error in the substrate thickness of the first blue-ray optical recording medium and the other is patterned for compensation for coma aberration of the second blue-ray optical recording medium.

FIG. 23(a) is an example of the electrode pattern for the compensation for coma aberration, which is composed of approximately elliptical patterns P1, P2, an approximately ring-shaped pattern P3 surrounding P1, P2, and approximately arcuate patterns P4, P5 provided outside the periphery of the pattern P3. These patterns P1 through P5 are arranged symmetrically along a radial direction of the optical recording medium (the direction of X1-X1' in FIG. 23(a)). When the coma aberration is compensated for, the surface of the other electrode functions in a predetermined condition, for example, as a solid electrode. Then, the distribution of retardation times for retarding the transmission of light (in other words, the distribution of phase differences) such as a pattern illustrated in FIG. 23(b) is generated in the liquid crystal layer by controlling voltages input to the patterns P1, P2, P3, P4, and P5.

FIG. 24(a) is an example of the electrode pattern for the compensation for spherical aberration, which is composed of approximately annular patterns P1, P2, P3, P4, and P5. These patterns P1 through P5 are arranged concentrically along a radial direction of the optical recording medium (the direction of X1-X1' in FIG. 24(a)). When the spherical aberration is compensated for, the surface of the other electrode functions in a predetermined condition, for example, as a solid electrode. Then, the distribution of retardation times for retarding the transmission of light (in other words, the distribution of phase differences) such as a pattern illustrated in FIG. 24(b) is generated in the liquid crystal layer by controlling voltages input to the patterns P1, P2, P3, P4, and P5.

Additionally, the electrode patterns P1 through P5 in FIG. 23(a) are controlled by a tilt compensation driver as described in embodiment 1 and, similarly, the electrode patterns P1 through P5 in FIG. 24(a) are controlled by a spherical aberration (SA) compensation driver as described in embodiment 1.

Figure 25:
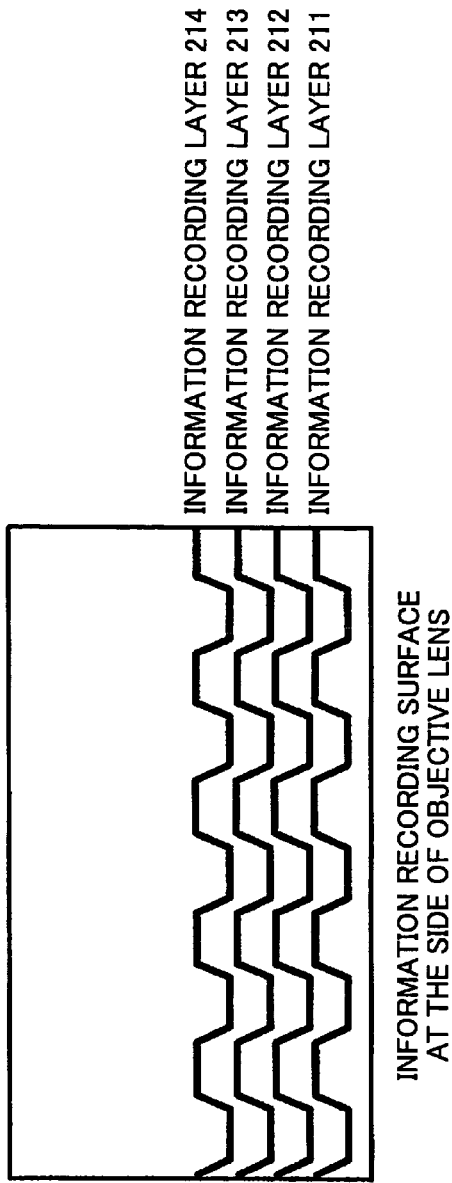
FIG. 25 is a diagram showing an example of a multi-layer optical recording medium with plural information-recording surfaces in embodiment 4 of the present invention.

FIG. 25 is an example of a multi-layer optical recording medium in embodiment 4 of the present invention, in which p (p≧2) layers each with an information-recording surface are formed in the direction of the thickness of the optical recording medium, of which layers (p-q) layer(s) at a front side near an objective lens is/are an information recording layer(s) with high recording density and q layer(s) at a back side away from the objective lens is/are an information recording layer(s) with low recording density. In this case, an optical pick-up focuses light beams with NA1 on (p-q) layer(s) with high information recording density and focuses light beams with a numerical aperture of NA2 smaller than NA1 on q layer(s) at the back side.

It is necessary to compensate for spherical aberration for the (p-q) layer(s) with a high NA at the front side and to compensate for coma aberration for q layer(s) with a low NA at the back side at which the thickness of a substrate is large, similar to embodiment 1, and the aberrations can be compensated for using the aberration compensation optical system and the control device for it which are described in embodiments 1 through 3.

Figure 26:
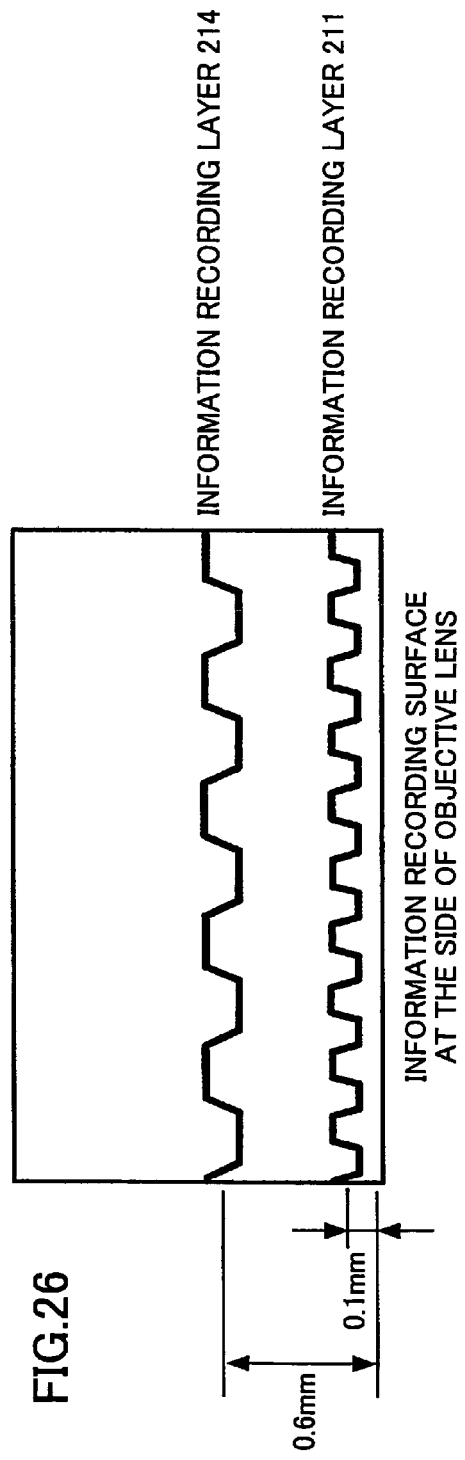
FIG. 26 is a diagram showing an example of a multi-layer optical recording medium with both the first optical recording medium format and the second optical recording medium format.

Further, the multi-layer optical recording medium may be, for example, a medium having both of two formats that correspond to the first blue-ray optical recording medium and the second blue-ray optical recording medium in embodiment 1, as shown in FIG. 26. That is, an information recording layer 211 is a layer with "an optimum NA of 0.85 and a substrate thickness of 0.1 mm at the side of light irradiation" and an information recording layer 214 is a layer with "an NA of 0.65 and a substrate thickness of 0.6 mm at the side of light irradiation" in FIG. 26.

In such an optical recording medium, a coma aberration compensation mechanism is held at a center position and the position of a spherical aberration compensation mechanism is corrected to the best position for the information-recording surface 211. Also, a spherical aberration compensation mechanism is held at a center position and the position of a coma aberration compensation mechanism is corrected to the best position for the information-recording surface 214.

Figure 27:
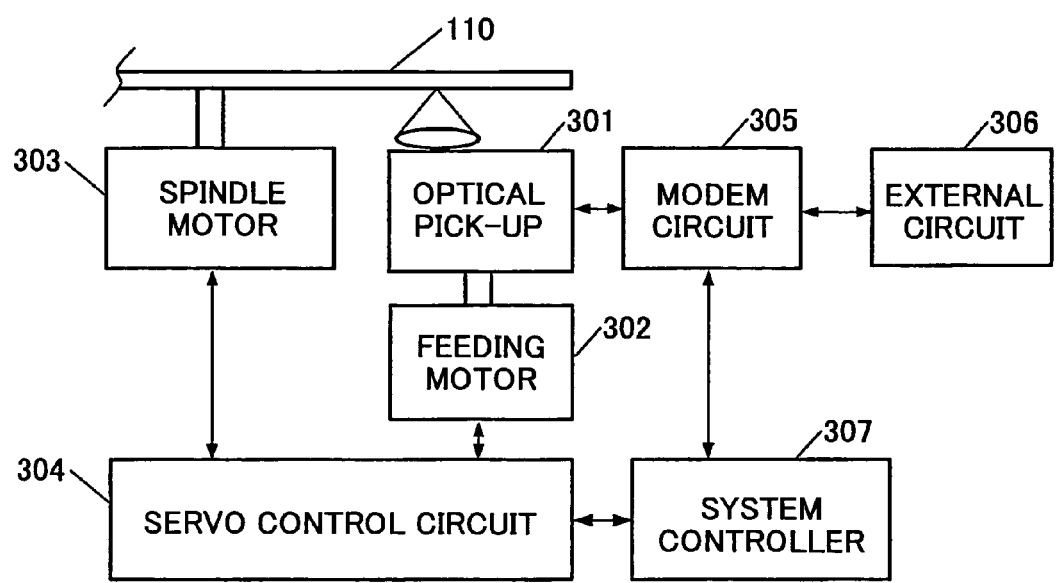
FIG. 27 is a schematic diagram showing the structure of an optical information processing apparatus in embodiment 5 of the present invention.

FIG. 27 is a schematic block diagram showing the structure of an optical information processing apparatus in embodiment 5 of the present invention. An optical information processing apparatus to perform recording and reproducing of an information signal for an optical recording medium using the optical pick-up in each of the aforementioned embodiments is provided. As shown in FIG. 27, the optical information processing apparatus includes a spindle motor 303 for the operation of rotating an optical recording medium 110, an optical pick-up 301 used to perform recording or reproducing of an information signal, a feeding motor 302 for the operation of moving the optical pick-up 301 between the inner periphery and outer periphery of the optical recording medium 110, a modem circuit 305 for performing predetermined modulation and demodulation processing, a servo control circuit 304 for performing servo control of the optical pick-up 301, and a system controller 307 for performing control of the whole of the optical information processing apparatus.

The spindle motor 303 of the optical information processing apparatus is driven and controlled by the servo control circuit 304 and rotated and driven at a predetermined number of revolutions. That is, the optical recording medium 110 as a target of recording or reproducing is chucked on the drive shaft of the spindle motor 303, driven and controlled by the servo control circuit 304, and rotated and driven at a predetermined number of revolutions by the spindle motor 303.

When the optical pick-up 301 performs the recording or reproducing of an information signal for the optical recording medium 110, laser light irradiates the rotated and driven optical recording medium 110 and the returned light thereof is detected as described above. Also, the optical pick-up 301 is connected to the modem circuit 305, and when recording of an information signal is performed, a signal input from an external circuit 306 to which predetermined modulation processing is applied by the modem circuit 305 is provided to the optical pick-up 301. The optical pick-up 301 irradiates the optical recording medium 110 with laser light to which the modulation of light intensity is applied, based on the signal provided from the modem circuit 305. Next, when reproducing of an information signal is performed, the optical pick-up 301 irradiates the rotated and driven optical recording medium 110 with laser light having a constant output, a reproduced signal is generated from the returned light thereof, and the reproduced signal is provided to the modem circuit 305.

Also, the optical pick-up 301 is connected to the servo control circuit 304. Then, a focus servo signal and a tracking servo signal are generated from the returned light reflected by and returned from the rotated and driven optical recording medium 110 at the time of recording or reproducing an information signal, as described above, and these servo signals are provided to the servo control circuit 304.

The modem circuit 305 is connected to the system controller 307 and the external circuit 306. The modem circuit 305 receives a signal to be recorded in the optical recording medium from the external circuit 306 under the control by the system controller 307 when the information signal is recorded in the optical recording medium 110, and predetermined modulation processing is applied to the signal. The signal modulated by the modem circuit 305 is provided to the optical pick-up 301. Also, the modem circuit 305 receives a signal reproduced from the optical recording medium 110, from the optical pick-up 301 under the control by the system controller 307 when the information signal is reproduced from the optical recording medium 110, and a predetermined demodulation processing is applied to the reproduced signal. Then, the signal demodulated by the modem circuit 305 is output from the modem circuit 305 to the external circuit 306.

The feeding motor 302 is to move the optical pick-up 301 to a predetermined position in the radial direction of the optical recording medium 110 when recording or reproducing of an information signal is performed, and is driven based on a control signal from the servo control circuit 304. That is, the feeding motor 302 is connected to the servo control circuit 304 and controlled by the servo control circuit 304.

The servo control circuit 304 controls the feeding motor 302 under the control by the system controller 307 so that the optical pick-up 301 is moved to a predetermined position opposing the optical recording medium 110. Also, the servo circuit 304 is connected to the spindle motor 303 and controls the operation of the spindle motor 303 under the control of the system controller 307. That is, the servo control circuit 304 controls the spindle motor 303 at the time of recording or reproducing an information signal for the optical recording medium 110 so that the optical recording medium 110 is rotated and driven at a predetermined number of revolutions.

Also, the servo control circuit 304 is connected to the optical pick-up 301, receives a reproduced signal and a servo signal from the optical pick-up 301 at the time of recording or reproducing an information signal, by performing the control of focus servo and tracking servo with a biaxial actuator (not shown in the figure) mounted on the optical pick-up 301 based on the servo signal, and further by adjusting the separation between respective lens groups in aberration compensation lens groups by controlling a uniaxial actuator, so as to perform aberration compensation.

As described above, according to the optical information processing apparatus in embodiment 5 of the present invention, the optimum processing for recording, reproducing, or erasing information can be performed, and an optical information processing apparatus having a low cost which can be further miniaturized can be configured by appropriately using the optical pick-up and the aberration generating method for compensation in the aforementioned embodiments 1 through 4.

The present invention is not limited to the specifically disclosed embodiment, and variations and modifications may be made without departing from the scope of the present invention.

The present application is based on Japanese Priority Application No. 2004-337193 filed on Nov. 22, 2004, the entire contents of which are hereby incorporated by reference.

APPENDIX (1) An optical pick-up to perform recording or reproducing for an optical recording medium, comprising
a light source configured to emit a light beam,
an objective lens configured to focus the light beam onto the optical recording medium, and
an aberration generation device provided between the light source and the objective lens, configured to generate coma aberration for the beam focused by the objective lens, based on a detected value from a device configured to detect a degree of tilt of the optical recording medium,
wherein the tilt is compensated for by the coma aberration generated by the aberration generation device.

(2) An optical pick-up to perform recording or reproducing of information for a first optical recording medium with a wavelength $\lambda 1$, a thickness t1 of a substrate thereof, and a numerical aperture NA1 for use thereof and a second optical recording medium with a wavelength $\lambda 1$, a thickness t2 ($>$t1) of a substrate thereof, and a numerical aperture NA2 ($<$NA1) for use thereof, comprising
an aberration generation device configured to generate coma aberration or spherical aberration for a beam focused by an objective lens,
a device configured to perform a first control operation comprising
  a first step of making a quantity of the coma aberration generated by the aberration generation device be a stored and predetermined value when a medium determination device configured to determine which of the first and second optical recording media is set determines that the first optical recording medium is set,
  a second step of changing a quantity of the spherical aberration generated by the aberration generation device to store a driving condition of the aberration generation device on which condition an amplitude of a recording information signal or a track error signal is maximum, and
  a third step of performing an operation of recording or reproducing while a quantity of the spherical aberration is added based on the driving condition, and
a device configured to perform a second control operation comprising
  a fourth step of making a quantity of the spherical aberration generated by the aberration generation device be a stored and predetermined value when the medium determination device determines that the second optical recording medium is set,
  a fifth step of changing a quantity of the coma aberration generated by the aberration generation device, to store a driving condition of the aberration generation device on which condition an amplitude of a recording information signal or a track error signal is maximum, and
  a sixth step of performing an operation of recording or reproducing while the quantity of the coma aberration is added based on the driving condition,
wherein the aberration generation device is controlled by the device for the first and second control operations.

(3) An optical pick-up to perform recording or reproducing of information for an optical recording medium in which p layers ($p \geqq 2$) each with an information-recording surface are formed in a direction of a thickness thereof of which layers (p-q) layer(s) at a front side near an objective lens is/are an information recording layer(s) with high recording density and q layer(s) at a back side away from the objective lens is/are an information recording layer(s) with low recording density, comprising
an aberration generation device configured to generate coma aberration or spherical aberration for a beam focused by the objective lens,
a device configured to perform a first control operation comprising
  a first step of making a quantity of the coma aberration generated by the aberration generation device be a stored and predetermined value when recording or reproducing of information is performed for the (p-q) layer(s) of the optical recording medium at the front side near the objective lens,
  a second step of changing a quantity of the spherical aberration generated by the aberration generation device to store a driving condition of the aberration generation device on which condition an amplitude of a recording information signal or a track error signal is maximum, and
  a third step of performing an operation of recording or reproducing while a spherical aberration is added based on the driving condition, and
a device configured to perform a second control operation comprising
  a fourth step of making a quantity of the spherical aberration generated by the aberration generation device be a stored and predetermined value when recording or reproducing of information is performed for the q layer(s) of the optical recording medium at the back side away from the objective lens,
  a fifth step of changing a quantity of the coma aberration generated by the aberration generation device to store a driving condition of the aberration generation device on which condition an amplitude of a recording information signal or a track error signal is maximum, and
  a sixth step of performing an operation of recording or reproducing while coma aberration is added based on the driving condition,
wherein control of the aberration generation device is performed by the device configured to perform the first and second control operations.

(4) The optical pick-up as described in any of (1) through (3) above, wherein the aberration generation device is composed of two lenses with refractive powers different from each other and a driving device, at least one of the lenses is moved along a direction of an optical axis to generate spherical aberration, and the other lens is moved along a direction orthogonal to the optical axis to generate coma aberration.

(5) The optical pick-up as described in any of (1) through (3) above, wherein the aberration generation device has an electrode pattern configured to generate coma aberration and an electrode pattern configured to generate spherical aberration and is a liquid crystal element that sandwiches a liquid crystal layer.

(6) The optical pick-up as described in any of (1) through (3) above, wherein the aberration generation device generates coma aberration in a radial direction of the optical recording medium.

(7) The optical pick-up as described in (2) above, wherein the aberration generation device generates under-spherical aberration at a time of recording or reproducing for the first optical recording medium and generates over-spherical aberration at a time of recording or reproducing for the second optical recording medium, at a center point of a beam focused by the objective lens to which beam no aberration is added.

(8) The optical pick-up as described in (3) above, wherein the aberration generation device generates under-spherical aberration at a time of recording or reproducing for the (p-q) layer(s) of the optical recording medium at the front side near the objective lens and generates over-spherical aberration at a time of recording or reproducing for the q layer(s) of the optical recording medium at the back side away from the objective lens, at a center point of a beam focused by the objective lens to which beam no aberration is added.

(9) The optical pick-up as described in (2) or (3) above, wherein a value on a condition on which aberration is best or an information signal is best in a process of assembling the optical pick-up is stored as the predetermined value, which value is used as a center point of the spherical aberration or the coma aberration generated by the aberration generation device.

(10) The optical pick-up as described in (3), wherein the optical recording medium has, at least, information-recording surfaces at any two or more thickness positions of 0.1 mm, 0.6 mm, and 1.2 mm from a side of the objective lens.

(11) The optical pick-up as described in (2) above, wherein the objective lens is a lens providing a best aberration for the first optical recording medium and is provided with an aberration compensation element comprising a diffraction-element or a phase shifter element between the objective lens and the aberration generation device.

(12) The optical pick-up as described in (11), wherein the aberration compensation element is provided with a diffraction element whereby recording or reproducing is made using light beams with selectively different diffraction orders dependent on an optical recording medium.

(13) The optical pick-up as described in (11) above, wherein the diffraction element is molded with the objective lens as one unit and a diffraction grating is formed on a surface of the objective lens at a side of a light source.

(14) A method of generating aberration for compensation for an optical pick-up to perform recording or reproducing for an optical recording medium, wherein a light beam emitted from a light source is focused on the optical recording medium through an objective lens and coma aberration is generated for a beam focused by the objective lens, based on a detected value from a tilt quantity detecting device for the optical recording medium, by an aberration generation device provided between the light source and the objective lens, so as to perform tilt compensation based on a quantity of the generated coma aberration.

(15) A method of generating aberration for compensation for an optical pick-up to perform recording or reproducing of information for a first optical recording medium with a wavelength $\lambda 1$, a thickness t1 of a substrate thereof, and a numerical aperture NA1 for use thereof and a second optical recording medium with a wavelength $\lambda 1$, a thickness t2 (>t1) of a substrate thereof, and a numerical aperture NA2 (<NA1) for use thereof, which performs, as a control of an aberration generation device configured to generate coma aberration or spherical aberration for a beam focused by an objective lens, a first control operation comprising a first step of making a quantity of the coma aberration generated by the aberration generation device be a stored and predetermined value when a medium determination device configured to determine which of the first and second optical recording media is set determines that the first optical recording medium is set, a second step of changing a quantity of the spherical aberration generated by the aberration generation device to store a driving condition of the aberration generation device on which condition an amplitude of a recording information signal or a track error signal is maximum, and a third step of performing an operation of recording or reproducing while a quantity of the spherical aberration is added based on the driving condition, and a second control operation comprising a fourth step of making a quantity of the spherical aberration generated by the aberration generation device be a stored and predetermined value when the medium determination device determines that the second optical recording medium is set, a fifth step of changing a quantity of the coma aberration generated by the aberration generation device, to store a driving condition of the aberration generation device on which condition an amplitude of a recording information signal or a track error signal is maximum, and a sixth step of performing an operation of recording or reproducing while the quantity of the coma aberration is added based on the driving condition.

(16) A method of generating aberration for compensation for an optical pick-up to perform recording or reproducing of information for an optical recording medium in which p layers ($p \geqq 2$) each with an information-recording surface are formed in a direction of a thickness thereof of which layers (p-q) layer(s) at a front side near an objective lens is/are an information recording layer(s) with high recording density and q layer(s) at a back side away from the objective lens is/are an information recording layer(s) with low recording density, which performs as a control of an aberration generation device configured to generate coma aberration or spherical aberration for a beam focused by the objective lens, a first control operation comprising a first step of making a quantity of the coma aberration generated by the aberration generation device be a stored and predetermined value when recording or reproducing of information is performed for the (p-q) layer(s) of the optical recording medium at the front side near the objective lens, a second step of changing a quantity of the spherical aberration generated by the aberration generation device to store a driving condition of the aberration generation device on which condition an amplitude of a recording information signal or a track error signal is maximum, and a third step of performing an operation of recording or reproducing while a spherical aberration is added based on the driving condition, and a second control operation comprising a fourth step of making a quantity of the spherical aberration generated by the aberration generation device be a stored and predetermined value when recording or reproducing of information is performed for the q layer(s) of the optical recording medium at the back side away from the objective lens, a fifth step of changing a quantity of the coma aberration generated by the aberration generation device to store a driving condition of the aberration generation device on which condition an amplitude of a recording information signal or a track error signal is maximum, and a sixth step of performing an operation of recording or reproducing while coma aberration is added based on the driving condition.

(17) The method of generating aberration for compensation as described in any of (14) through (16) above, wherein the aberration generation device is composed of two lenses with refractive powers different from each other and a driving device, at least one of the lenses is moved along a direction of an optical axis to generate spherical aberration, and the other lens is moved along a direction orthogonal to the optical axis to generate coma aberration.

(18) The method of generating aberration for compensation as described in any of (14) through (16), wherein the aberration generation device has an electrode pattern configured to generate coma aberration and an electrode pattern configured to generate spherical aberration and is a liquid crystal element that sandwiches a liquid crystal layer.

(19) The method of generating aberration for compensation as described in any of (14) through (16) above, wherein the aberration generation device generates coma aberration in a radial direction of the optical recording medium.

(20) The method of generating aberration for compensation as described in (15) above, wherein the aberration generation device generates under-spherical aberration at a time of recording or reproducing for the first optical recording medium and generates over-spherical aberration at a time of recording or reproducing for the second optical recording medium, at a center point of a beam focused by the objective lens to which beam no aberration is added.

(21) The method of generating aberration for compensation as described in (16) above, wherein the aberration generation device generates under-spherical aberration at a time of recording or reproducing for the (p-q) layer(s) of the optical recording medium at the front side near the objective lens and generates over-spherical aberration at a time of recording or reproducing for the q layer(s) of the optical recording medium at the back side away from the objective lens, at a center point of a beam focused by the objective lens to which beam no aberration is added.

(22) The method of generating aberration for compensation as described in (15) or (16) above, wherein a value on a condition on which aberration is best or an information signal is best in a process of assembling the optical pick-up is stored as the predetermined value, which value is used as a center point of the spherical aberration or the coma aberration generated by the aberration generation device.

(23) An optical information processing apparatus to perform recording or reproducing of information for an optical recording medium, wherein the optical pick-up as described in any of (1) through (13) above is provided.

(24) An optical information processing apparatus to perform recording or reproducing of information for an optical recording medium, wherein the method of generating aberration for compensation as described in any of (14) through (22) above is used.

According to the configuration as described above, tilt compensation or aberration compensation can be performed depending on the kind of optical recording medium by making one of quantities of generated coma aberration and generated spherical aberration be a predetermined value and changing the other using an aberration generation device for generating coma aberration and spherical aberration, for a light beam focused by an objective lens. Also, according to the configuration as described above, two aberrations can be compensated for by only one compensation element, while recording or reproducing of information for an optical recording medium can be performed.

INDUSTRIAL APPLICABILITY

An optical pick-up and method of generating aberration for compensation, and an optical information processing apparatus using the same, according to the present invention are useful for an apparatus which can compensate for tilt by coma aberration generated based on a detected value from a tilt detecting device for an optical recording medium, can simply and reliably compensate for each of spherical aberration caused by a substrate thickness error of the first optical recording medium and coma aberration caused by tilt of the second optical recording medium, and can compensate for two aberrations, that is, spherical aberration and coma aberration by only one compensation element, while at least one of recording, reproducing, and erasing of information for plural optical recording media or a multi-layer optical recording medium is performed.

The invention claimed is:

1. An optical pick-up to perform recording or reproducing of information for a first optical recording medium with a first light beam of wavelength $\lambda 1$, a thickness t1 of a substrate thereof, and a numerical aperture NA1 for use thereof and a second optical recording medium with a second light beam of wavelength $\lambda 1$, a thickness t2 ($>$t1) of a substrate thereof, and a numerical aperture NA2 ($<$NA1) for use thereof, comprising:

an objective lens to focus the first light beam or the second light beam;

an aberration generation device configured to generate coma aberration or spherical aberration for the first light beam or the second light beam focused by the objective lens; and a control device configured to determine which of the first and second optical recording media is set and to perform a first control operation when the first optical recording medium is set or to perform a second control operation when the second optical recording medium is set;

wherein the first control operation comprises:

a first step of setting a quantity of the coma aberration generated by the aberration generation device to a predetermined stored value, a second step of varying a quantity of the spherical aberration generated by the aberration generation device to determine and store a driving condition of the aberration generation device, wherein the driving condition is a condition for which an amplitude of a recording information signal or a track error signal is at a maximum, and a third step of performing an operation of recording or reproducing while a quantity of the spherical aberration is added based on the driving condition; and wherein the second control operation comprises:

a fourth step of setting a quantity of the spherical aberration generated by the aberration generation device to a predetermined stored value, a fifth step of varying a quantity of the coma aberration generated by the aberration generation device to determine and store a driving condition of the aberration generation device, wherein the driving condition is a condition for which an amplitude of a recording information signal or a track error signal is at a maximum, and a sixth step of performing an operation of recording or reproducing while the quantity of the coma aberration is added based on the driving condition, wherein the aberration generation device is controlled by the control device, wherein the objective lens is a lens providing a best aberration for the first optical recording medium and is provided with an aberration compensation element comprising a diffraction element or a phase shifter element between the objective lens and the aberration generation device, and wherein the aberration compensation element is provided with a diffraction element whereby recording or reproducing is made using light beams with selectively different diffraction orders dependent on an optical recording medium.

2. The optical pick-up as claimed in claim 1, wherein the aberration generation device is composed of two lenses with refractive powers different from each other and a driving device, at least one of the lenses is moved by the driving device along a direction of an optical axis to generate spherical aberration, and the other lens is moved by the driving device along a direction orthogonal to the optical axis to generate coma aberration.

3. The optical pick-up as claimed in claim 1, wherein the aberration generation device has an electrode pattern configured to generate coma aberration and an electrode pattern configured to generate spherical aberration and is a liquid crystal element that sandwiches a liquid crystal layer.

4. The optical pick-up as claimed in claim 1, wherein the aberration generation device generates coma aberration in a radial direction of the optical recording medium.

5. The optical pick-up as claimed in claim 1, wherein the aberration generation device generates under-spherical aberration at a time of recording or reproducing for the first optical recording medium and generates over-spherical aberration at a time of recording or reproducing for the second optical recording medium, at a center point of a beam focused by the objective lens to which beam no aberration is added.

6. The optical pick-up as claimed in claim 1, wherein a value on a condition on which aberration is best or an information signal is best in a process of assembling the optical pick-up is stored as the predetermined value, which value is used as a center point of the spherical aberration or the coma aberration generated by the aberration generation device.

7. An optical information processing apparatus to perform recording or reproducing of information for an optical recording medium, wherein the optical pick-up as claimed in claim 1 is provided.

8. An optical pick-up to perform recording or reproducing of information for a first optical recording medium with a first light beam of wavelength $\lambda 1$, a thickness $t1$ of a substrate thereof, and a numerical aperture NA1 for use thereof and a second optical recording medium with a second light beam of wavelength $\lambda 1$, a thickness $t2$ ($>t1$) of a substrate thereof, and a numerical aperture NA2 (<NA1) for use thereof, comprising:

an objective lens to focus the first light beam or the second light beam;

an aberration generation device configured to generate coma aberration or spherical aberration for the first light beam or the second light beam focused by the objective lens; and a control device configured to determine which of the first and second optical recording media is set and to perform a first control operation when the first optical recording medium is set or to perform a second control operation when the second optical recording medium is set;

wherein the first control operation comprises:

a first step of setting a quantity of the coma aberration generated by the aberration generation device to a predetermined stored value, a second step of varying a quantity of the spherical aberration generated by the aberration generation device to determine and store a driving condition of the aberration generation device, wherein the driving condition is a condition for which an amplitude of a recording information signal or a track error signal is at a maximum, and a third step of performing an operation of recording or reproducing while a quantity of the spherical aberration is added based on the driving condition; and wherein the second control operation comprises:

a fourth step of setting a quantity of the spherical aberration generated by the aberration generation device to a predetermined stored value, a fifth step of varying a quantity of the coma aberration generated by the aberration generation device to determine and store a driving condition of the aberration generation device, wherein the driving condition is a condition for which an amplitude of a recording information signal or a track error signal is at a maximum, and a sixth step of performing an operation of recording or reproducing while the quantity of the coma aberration is added based on the driving condition, wherein the aberration generation device is controlled by the control device wherein the objective lens is a lens providing a best aberration for the first optical recording medium and is provided with an aberration compensation element comprising a diffraction element or a phase shifter element between the objective lens and the aberration generation device, and wherein the diffraction element is molded with the objective lens as one unit and a diffraction grating is formed on a surface of the objective lens at a side of a light source.

* * * * *